(12) United States Patent
Holt et al.

(10) Patent No.: US 11,491,711 B2
(45) Date of Patent: Nov. 8, 2022

(54) METHOD OF MAKING 3D PRINTED OBJECTS USING TWO DISTINCT LIGHT SOURCES

(71) Applicant: PhotoCentriC Limited, Peterborough (GB)

(72) Inventors: Paul Holt, Peterborough (GB); Sarah Karmel, Peterborough (GB)

(73) Assignee: PhotoCentriC Limited, Peterborough (GB)

( * ) Notice: Subject to any disclaimer, the term of this patent is extended or adjusted under 35 U.S.C. 154(b) by 180 days.

(21) Appl. No.: 16/787,282

(22) Filed: Feb. 11, 2020

(65) Prior Publication Data

US 2020/0282638 A1 Sep. 10, 2020

(30) Foreign Application Priority Data

Feb. 11, 2019 (GB) ..................... 1901811

(51) Int. Cl.

| | |
|---|---|
| *B29C 64/129* | (2017.01) |
| *B29C 64/277* | (2017.01) |
| *B29C 64/245* | (2017.01) |
| *B29C 64/227* | (2017.01) |
| *C08F 2/50* | (2006.01) |
| *C08F 222/10* | (2006.01) |

(Continued)

(52) U.S. Cl.
CPC .......... *B29C 64/129* (2017.08); *B29C 64/227* (2017.08); *B29C 64/245* (2017.08); *B29C 64/277* (2017.08); *C08F 2/50* (2013.01); *C08F 222/103* (2020.02); *C08F 222/1065* (2020.02); *C08K 5/1545* (2013.01); *C08K 5/56* (2013.01); *B33Y 10/00* (2014.12); *B33Y 30/00* (2014.12); *B33Y 70/00* (2014.12)

(58) Field of Classification Search
CPC ... B29C 64/268; B29C 64/273; B29C 64/277; B29C 64/285; B29C 64/291; B29C 64/129; B29C 64/135; B29C 64/264; B29C 64/282; B29C 64/286
See application file for complete search history.

(56) References Cited

U.S. PATENT DOCUMENTS

| | | | | |
|---|---|---|---|---|
| 5,236,812 A | * | 8/1993 | Vassiliou | ............... B33Y 10/00 430/394 |
| 9,034,236 B2 | * | 5/2015 | Xu | ......... B33Y 10/00 264/401 |

(Continued)

FOREIGN PATENT DOCUMENTS

| | | | |
|---|---|---|---|
| CN | 109228303 A | 1/2019 | |
| KR | 2248644 B1 * | 5/2021 | ......... B29C 35/0805 |
| WO | 2019194798 A1 | 10/2019 | |

OTHER PUBLICATIONS

Great Britain Search Report issued in counterpart GB Application No. 1901811.8 dated Jul. 31, 2019.

*Primary Examiner* — Atul P. Khare
(74) *Attorney, Agent, or Firm* — Nexsen Pruet, PLLC; E. Eric Mills; Nicholas P. Stadnyk

(57) ABSTRACT

This invention relates to the field of 3D printing used to make a 3D object where a 3D printed object is formed using electromagnetic radiation emitted from a visual display screen or emissive pixel array screen illuminated by radiation sources with effectively non-overlapping wavelength emission spectra with the effect of creating two different polymerised properties in the object.

20 Claims, 2 Drawing Sheets

(51) Int. Cl.
    *C08K 5/1545*     (2006.01)
    *C08K 5/56*     (2006.01)
    *B33Y 70/00*     (2020.01)
    *B33Y 10/00*     (2015.01)
    *B33Y 30/00*     (2015.01)

(56) References Cited

U.S. PATENT DOCUMENTS

| | | | |
|---|---|---|---|
| 9,708,442 B1* | 7/2017 | Kwisnek | C08G 59/245 |
| 10,792,859 B2* | 10/2020 | Van Esbroeck | B33Y 10/00 |
| 2017/0022311 A1 | 1/2017 | Liu et al. | |
| 2018/0015662 A1* | 1/2018 | Ermoshkin | B29C 64/124 |
| 2018/0126637 A1* | 5/2018 | Tyler | B29C 64/245 |
| 2020/0171740 A1* | 6/2020 | Boydston | B29C 64/245 |
| 2021/0162670 A1* | 6/2021 | Nichols | B29C 64/393 |
| 2022/0040915 A1* | 2/2022 | Rao | B29C 71/0009 |

\* cited by examiner

METHOD OF MAKING 3D PRINTED OBJECTS USING TWO DISTINCT LIGHT SOURCES

TECHNICAL FIELD

This invention relates to the field of 3D printing used to make a 3D object where a 3D printed object is formed using electromagnetic radiation emitted from a visual display screen or emissive pixel array screen illuminated by radiation sources with effectively non-overlapping wavelength emission spectra with the effect of creating two different polymerised properties in the object.

BACKGROUND

Three-dimensional (3D) printing, also known as rapid prototyping or additive manufacturing, is a method of forming 3D objects by building up sequential layers, each layer defined by a digital representation. The digital representations may be formed by scanning a physical object in three-dimensions or may be formed by digitally sectioning a three-dimensional computer-aided design (CAD) image into layers, typically of equal thicknesses.

In stereolithography apparatus printing (SLA), the printer builds 3D objects from successive layers of selectively polymerised liquid photosensitive polymer (resin), also referred to as photopolymer. The liquid photopolymer is polymerised (hardened) by electromagnetic radiation exposure of an appropriate wavelength, e.g. visible light or near visible ultraviolet light.

To form a 3D printed object by stereolithographic 3D printing, selective illumination by electromagnetic radiation is provided from an imaging source to form each layer, with the first layer being formed on a build platform, the separation distance between the build platform and imaging source being increased by the thickness of a layer with the next layer of selective polymerisation being formed on the preceding layer. The process of selective exposure and separation is repeated until the complete 3D printed object has been built layer by layer.

Traditionally photopolymer was selectively hardened by light emitted from a laser beam or by focusing the light from a digital light processing (DLP) projector emitted through its digital mirror device. This could be irradiated onto either the upper or lower layer of resin in a vat. This invention relates to the field of 3D printing where the image source is a visual display screen, commonly an LCD screen. LCD screens have recently become widely used by manufacturers who have incorporated the screens as the digital mask to deliver the custom photopolymerisation. LCD screens are particularly attractive as an image creation device in 3D printers because they are mass manufactured consumer items and are therefore available at very low cost. Furthermore, they generate very high-resolution images driven by the demand to view higher and higher image quality images on them. They also expose an entire layer of the vat simultaneously, with very even light distribution without any requirement to refocus the light through a lens. They are available in a wide variety of formats from the very small screens used in near-eye headsets, through mobiles, tablets, monitors up to TV screens. They are also simpler to incorporate into 3D printers than the competitive technologies. In the case of a laser 3D printer, complex electronics and galvanometers are required and correspondingly in the case of a DLP printer a lens is required to refocus the widening light beam back into a smaller area. In contrast, visual display screen device-based 3D printers are effectively a digitally controllable light mask that defines the area of the build platform with an optionally modified light generation source, an electronic control board, a linear drive and a resin containment vat.

In the typical process of making an object by SLA printing; the object is created by sequential exposure of liquid photopolymer to light in layers, interspersed by motion perpendicularly away from the light generation surface, the finished object is then elevated from the photopolymer vat, the resin attached to the surface of the object being allowed to drain back into the vat, the print platform to which the object has been built upon is then typically removed from the printer by hand and transferred to a wash station where it is washed with a solvent solution to remove any remaining liquid resin attached to the object, it is then rinsed and transferred to a separate post exposure station where it is irradiated with uniform light of a similar wavelength to that which created the object in the first place, optionally this process can take place under water, before it is rinsed again and dried ready for use.

In order to attach a plate to the platform, a set of supports typically joins the platform and the object together and enable it to be suspended in free space. These supports have to be removed after post exposure, this being a time-consuming process that also leaves defects on the object's surface. It is an objective of this invention to provide a method of enabling the supports structure to be cured by a different wavelength of light to that which polymerised the object itself and in so doing, to enable the supports to be either weaker or soluble in a fluid that the object in not soluble in. The use of weaker, or soluble supports would have a significant advantage over current 3D printing methods, as the object fabricated using the 3D printing method of this invention would display a smoother surface, requiring only minor mechanical post treatment of the 3D printed object for support removal.

Furthermore, it is an objective of this invention to provide a method wherein the object can selectively have two differing properties depending upon the wavelength of the light emitted by LCD screen, which leads to the selective polymerisation of different materials. In this manner the object can be, for example, both flexible and rigid in specific areas, depending upon whether the pixels in the LCD array were allowing radiation through to create one property allowing different radiation through to create another property.

A multi-material approach for 4D printing, that uses only one wavelength is described in https://www.nature.com/articles/srep31110.

'Rapid, continuous additive manufacturing by volumetric polymerisation inhibition pattern', Martin P. de Beer et al., Science Advances 2019, DOI: 10.1126/sciadv.aau8723, herein incorporated in its entirety, describes the use of two different illumination sources with two different wavelengths to achieve a continuous 3D printing process. In this process the photopolymer resin formulations contain a complementary photoinitiator and photoinhibitor with complementary absorption spectra. While the illumination with the first wavelength initiates the polymerisation process, the illumination with the second wavelength inhibits the polymerisation process immediately. The process claims to eliminate adhesion and enable continuous 3D printing using a multicolour system. The resins described were formulated using camphorquinone (CQ) as photoinitiator, 4-(dimeyhylamino)benzoate (EDAB) as co-initiator and bis [2-(o-chlorophenyl)-4,5-dphenylimidazole} as inhibitor.

International patent applications PCT/GB2016/052960, PCT/GB2016/051361 and PCT/GB2017/053442 to Holt, herein incorporated by reference in its entirety, describe 3D printing inks, consisting of organic photopolymers with visible light active photoinitiators, which can further incorporate micron or nanometer sized particles, such as, but not limited to, ceramics, metals, sand and pigments. The 3D printing inks can be selectively hardened using visible light emitted from LCD screens, including, but not limited to tablets, mobile phones and TV and display screens.

SUMMARY OF THE DISCLOSURE

In a first aspect of the invention is a method for creating a 3D object, the method comprising:
  forming a plurality of layers of cured polymer by exposing a liquid photopolymer formulation to a first spectrum of light and a second spectrum of light to form the 3D object;
wherein there is no overlap between the first spectrum of light and the second spectrum of light; and wherein the photopolymer formulation comprises:
  a first photoinitiator that is activated by light in the first spectrum of light;
  a second photoinitiator that is activated by light in the second spectrum of light;
  a first set of at least one monomer or oligomer that can be polymerised when the first photoinitiator is activated; and
  a second set of at least one monomer or oligomer that can be polymerised when the second photoinitiator is activated.

In a second aspect of the invention is provided a liquid photopolymer formulation for forming objects when exposed to a light said formulation comprising:
at least one monomer or oligomer that can be polymerised via a light-induced radical photopolymerisation process, but not via a cationic polymerisation process;
at least one monomer or oligomer that can be polymerised via a light-induced cationic mechanism, but not via a radical polymerisation process;
at first photoinitiator that is activated by light in the UV or blue light in the range between 300-475 nm;
at second photoinitiator that is activated by light in the green or red region of the electromagnetic spectrum; and
at least one co-initiator;
wherein one of the first and second photoinitiators induces a cationic polymerisation process when activated and the other of the first and second photoinitiators induces a radical polymerisation process when activated.

In a third aspect of the invention is provided a stereolithographic 3D printer comprising a visual display screen illuminated by two light sources with differing peak emissions, the first light source emitting a first spectrum of light and the second light source emitting a second spectrum of light; wherein there is no overlap between the first spectrum of light and the second spectrum of light.

The methods of the first aspect of the invention may be carried out with a liquid photopolymer formulation of the second aspect of the invention and/or a stereolithographic 3D printer of the third aspect of the invention.

The invention relates to techniques to create two differing end properties in a 3D printed object using a visual display screen as the imaging source with two or more light back light sources which have distinctly different wavelength emission spectra. The process can be shown to be enacted in a number of ways, for instance: a predominantly UV light source being emitted through the same array as a predominantly visible light source, a predominantly infra-red light source being emitted through the same array as a predominantly visible light source and two distinctly visible light sources such as blue and red light. The advantage of the last scenario is that both light sources are readily emitted through a colour LCD screen via the blue sub-pixel and the red-sub-pixel when the LCD panel is back-illuminated with white-light.

It could be that the object is formed by forming a first set of layers by exposure to the first spectrum of light and forming a second set of layers by exposure to the second spectrum of light. In this embodiment, it may be that the layers exposed to the first spectrum of light together form a first portion or first group of portions of the 3D object and those exposed to the second spectrum of light together form a second portion or group of portions of the 3D object. Thus, an object can be formed in a single printing process that has different portions having different physical properties. Alternatively, it may be that the layers exposed to the first spectrum of light and the layers exposed to the second spectrum of light form alternating layers. Thus, an object can be formed for which the whole of the object has a mixture of the properties of the two polymer resins. It may be that within any given layer, a first set of pixels are exposed to the first spectrum of light and a second set of pixels are exposed to the first spectrum of light. Again, this can either give rise to an object that has different portions having different physical properties or it can give rise to an object in which the whole of the object has a mixture of the properties of the two polymer resins. It may be that each layer and each pixel of the 3D object is simultaneously exposed to both the first and the second spectra of light. This gives rise to an object in which the whole of the object has a mixture of the properties of the two polymer resins. The printing process may comprise a mixture of any two or more of the exposure arrangements described above. After formation of the solid object, the remaining liquid photopolymer can be removed and re-used for further prints.

The two polymerisation processes used for the object fabrication will typically be distinct and non-overlapping. This is achieved by using two different polymerisation mechanisms, such as a cationic polymerisation mechanism and a radical initiated mechanism, which involve the use of two different photoinitiators. The polymerisation processes are distinct and non-overlapping. This is evidenced by the combined activities of the photoinitiators present having a region of no activity between their absorption spectra, thus a region of almost no light absorption between the upper end of the absorbance spectrum of one photoinitiator and the lower end of the absorbance of the second photoinitiator.

The two polymerisation processes used for the object fabrication may arise due to a first monomer reacting with a first photoinitiator to produce a first polymeric material and a second monomer reacting with a second photoinitiator to produce a second polymeric material. The two polymerisation processes may be used simultaneously to produce a 3D object comprising a polymeric material that is a mixture of the first and second polymeric materials. The two polymerisation processes may be used simultaneously to produce a 3D object that comprises a region of first polymeric material and a region of second polymeric material.

The two polymerisation processes occur during the forming of the plurality of layers of cured polymer. That is, both polymerisation processes are necessary for the formation of the plurality of layers that create the 3D object. The two polymerisation processes may occur simultaneously or in sequence. For example, the 3D object may be created by activating a first and second photoinitiator at the same time and/or at different times during the formation of the plurality of layers that form the 3D object.

The first polymerisation process may be a radical photopolymerisation process. The second polymerisation process may be a cationic photopolymerisation process.

FIG. 1 is a schematic representation of the absorption spectra of two different photoinitiators with wavelength shown on the x-axis and absorbance/activity represented on the y-axis, this shows a clear separation between the upper activity of the shorter one and the lower activity of the longer one. For example, photoinitiator 1 could be blue light and photoinitiator 2 could be red light.

Further provided is a liquid photopolymer resin for the formation of a 3D dimensional object with at least two different mechanical or thermal properties when exposed to two different light spectra, the formulation comprising;

at least one monomeric or oligomeric chemical species comprising at least one carbon-carbon double bond that is polymerisable by free radical polymerisation. This oligomeric or monomeric species is present in a total amount of 10-95 wt %;

at least one monomeric or oligomeric chemical species comprising at least one heterocycle, preferably an oxygen containing heterocyclic moiety, polymerisable by cationic polymerisation. This oligomeric or monomeric species is present in a total amount of 10-95 wt %;

at least one photoinitiator, that absorbs UV, or blue light in the region between 300 nm and 475 nm, herein referred to as blue-light photoinitiator and at least one photoinitiator that absorbs green, orange or red light in the region between 520 nm and 660 nm, herein referred to as green-light or red-light photoinitiator, respectively. These are present in a total amount of 0.1-20 wt %;

at least one co-initiator present in a total amount of 0.1-20 wt %;

and optionally the resin formulation can contain a pigment, dye, ceramic, sand, or metal filler.

The liquid photopolymer formulation according to the present invention comprises a first set of at least one monomer or oligomer that can be polymerised when the first photoinitiator is activated. The first set of monomeric or oligomeric chemical species may be polymerisable by free radical polymerisation. The first set of monomeric or oligomeric chemical species may comprise at least one carbon-carbon double bond that is polymerisable by free radical polymerisation. The first set of oligomeric or monomeric species may be present in a total amount of 10-95 wt %.

The liquid photopolymer formulation according to the present invention comprises a second set of at least one monomer or oligomer that can be polymerised when the second photoinitiator is activated. The second set of monomeric or oligomeric chemical species may comprise at least one heterocycle. The at least one heterocycle is preferably an oxygen containing heterocyclic moiety. The monomer or oligomer may be polymerisable by cationic polymerisation. The oxygen containing heterocyclic moiety may be polymerisable by cationic polymerisation. The second set of oligomeric or monomeric species may be present in a total amount of 10-95 wt %; The liquid photopolymer formulation according to the present invention comprises a first photoinitiator. The first photoinitiator may absorb UV, or blue light in the region from 300 nm to 475 nm, herein also referred to as blue-light photoinitiator. The blue-light photoinitiator initiates free radical polymerisation.

The liquid photopolymer formulation according to the present invention comprises a second photoinitiator. The second photoinitiator may absorb green, orange or red light in the region from 520 nm to 660 nm, herein also referred to as green-light or red-light photoinitiator, respectively. The green-light or red-light photoinitiator may intiate cationic polymerisation.

These first and second photoinitiators may be present in a combined total amount of 0.1-20 wt %.

The liquid photopolymer formulation according to the present invention may comprise at least one co-initiator. The at least one co-initiator may be present in a total amount of 0.1-20 wt %.

The liquid photopolymer formulation according to the present invention may comprise a pigment, dye, ceramic, sand, or metal filler.

It may be that the formulation comprises at least one monomeric species comprising at least one carbon-carbon double bond that is polymerisable by free radical polymerisation and at least one oligomeric species comprising at least one carbon-carbon double bond that is polymerisable by free radical polymerisation. The monomeric species is present in a total amount of 20-90 wt %. It may be that the total amount of oligomeric species with at least one carbon-carbon double bond is between 25-75 wt %. It may be that the total amount of oligomeric species which is polymerisable via a free radical polymerisation is between 30-70 wt %. It may be that the total amount of oligomeric species comprising at least one carbon-carbon double bond is present in the formulation is 40-60 wt %.

It may be that the total amount of monomeric species with at least one carbon-carbon double bond is between 25-85 wt %. It may be that the total amount of monomeric species which is polymerisable via a free radical polymerisation is between 30-65%. It may be that the total amount of monomeric species comprising at least one carbon-carbon double bond is 35-50%.

It may be that the formulation comprises at least one aliphatic urethane monomer, it may that the aliphatic urethane monomer comprises a single carbon-carbon double bond, that can be polymerised via a radical polymerisation mechanism. The aliphatic urethane monomer may comprise an acrylate group. Said aliphatic urethane monomer may comprise a methacrylate group. Said aliphatic urethane monomer may be present at 10-70 wt %.

It may that the oligomeric species is an aliphatic urethane acrylate oligomer, which contains one, two or three acrylate groups, depending on the desired properties of the cured product.

It may be that the formulation comprises at least one epoxy acrylate oligomer, it may that the aliphatic epoxy acrylate oligomer comprises a single carbon-carbon double bond, that can be polymerised via a radical polymerisation mechanism. Said epoxy acrylate may comprise a single acrylate group, two acrylate groups or three acrylate groups, depending on the desired properties of the cured product.

It may be that the urethane acrylate monomer is used in combination with the epoxy acrylate oligomer, comprising multiple carbon-carbon double bonds.

The urethane and epoxy acrylate monomers, comprising at least one carbon-carbon double and polymerisable via a radial polymerisation may be chosen from: nonyl phenol (4EO) acrylate, isobornyl acrylate (IBOA), phenoxyethyl acrylate (PEA), phenol (4EO) acrylate, o-phenylphenoxyethyl acrylate (OPPEOA), cyclic trimethylpropane formal acrylate (CTFA), tetrahydrofuryl acrylate (CTFA), 2-(2ethoxyethoxyl) ethyl acrylate (EOEOEA), octyl decyl acrylate (ODA), isodecyl acrylate (IDA), lauryl acrylate (LA), tripropyleneglycol monomethyl ethyl acrylate (TPGMEMA), hexanediol diacrylate (HDDA), bisphenol-A (4EO) diacrylate, polyethyleneglycol 200 diacrylate (PEG200DA), polyethylene glycol 300 diacrylate (PEG300DA), polyethyleneglycol 400 diacrylate (PEG400DA), polyethyleneglycol 600 diacrylate (PEG600DA), tripropyleneglycol diacrylate (TPGDA), 3-methyl-1,5-pentanediol diacrylate (MPDDA), neopnetylglycol (2PO) diacrylate (NPGPODA), dipropyleneglycol diacrylate (DPGDA), hexanediol (2EO) diacrylate (HD2EODA), hexanediol (2PO) diacrylate (HD2PODA), trimethylolpropane triacrylate (TMPTA), trimethylolpropane (3PO) triacrylate (TMP3POTA), glyceryl (4PO) triacrylate (GPTA), trimethylpropane (3EO) triacrylate (TMP3EOTA), trimethylpropane (9EO) triacrylate (TMP9EOTA), trimethylpropane (15EO) triacrylate (TMP15EOTA), tris(2-hydroxy ethyl) isocyanurate triacrylate (THEICTA), pentaerythriol tri and tetraacrylate, pentaerythritol (5EO) tatraacrylate (PPTTA), ditrimethylolpropane tetra-acrylate (DiTMPTA), dipentaerythritol hexaacrylate (DPPA), dipentaerythritol hexaacrylate (DPHA), acrylated epoxy soy oil (ESBOA), bisphenol A epoxy diacrylate, caprolactone acrylate (CA), 3,3,5-trimethyl cyclohexyl acrylate (TMCHA), 4-tert-butylcyclohexyl acrylate (TBCHA), benzyl acrylate (BZA), tridecyl acrylate (TDA), isodecyl acrylate (IDA), phenol (2EO) acrylate, nonyl phenol (4EO) acrylate, nonyl phenol (8EO) acrylate, nonyl phenol (PO)2 acrylate ethoxy ethoxy ethyl acrylate (EOEOEA), stearyl acrylate 1,6-hexandiol (5EO) diacrylate, hydroxypivalic acid neopentyl glycol diacrylate, neopentylglycol (2PO) diacrylate, dipropylene glycol diacrylate (DPGDA), triethylene glycol diacrylate (TEGDA), tricyclodecane dimethanol diacrylate (TCDDA), tetraethylene glycol diacrylate (TTEGDA), glycerine (3PO) triacrylate (GPTA), pentaerythritol triacrylate (PETIA), trimethylol propane (6EO) triacrylate (TMP(EO)6TA), and oligomers thereof.

The urethane and epoxy acrylate monomers, comprising at least one carbon-carbon double and polymerisable via a radial polymerisation may be chosen from: trimethylol propane triacrylate (TMPTA), neopentylglycol (2PO) diacrylate, tricyclodecane dimethanol diacrylate (TCDDA), polyethyleneglycol 200 diacrylate (PEG200DA), and trimethylol propane (6EO) triacrylate (TMP(EO)6TA).

The acrylate and methacrylate monomers may be selected from: ethylene glycol dimethacrylate (EGDMA), Triethylene glycol dimethacrylate (TEGDMA), diethylene glycol dimethacrylate (DEGDMA, trimethylolpropane trimethacrylate (TMPTMA), isobornyl methacrylate (IBOMA), polyethylene 200 di-methacrylate (PEG200DMA), polyethylene 400 di-methacrylate (PEG400DMA), polyethylene 600 di-methacrylate (PEG600DMA), bisphenol-A (2EO) dimethacrylate, bisphenol-A (4EO) dimethacrylate, bisphenol-A (3EO) dimethacrylate, bisphenol-A (10EO) dimethacrylate, bisphenol-A (30EO) dimethacrylate lauryl methacrylate (LMA), polypropylene glycol monomethacrylate (PPG5MMA), benzyl methacrylate, lauryl tetradecyl methacrylate, isodecyl methacrylate, phenoxymethyl methacrylate, stearyl methacrylate (SMA), methoxy PEG600 methacrylate, 1,6-hexanediol dimethacrylate (HDDMA), 1,6-haxanediol diacrylate (HDDA), 1,4-butanediol dimethacrylate (BDDMA), neopentyl glycol dimethacrylate (NPGDMA), ethylene glycol diemthacrylate (EGDMA), diethylene glycol diemthacrylate (DEDGMA), 1,3-butylene glycol dimethacrylate, urethane dimethacrylate and oligomers thereof. A selection of suitable acrylate and methacrylate monomers, which can be polymerised using a radical photopolymerisation process are shown here:

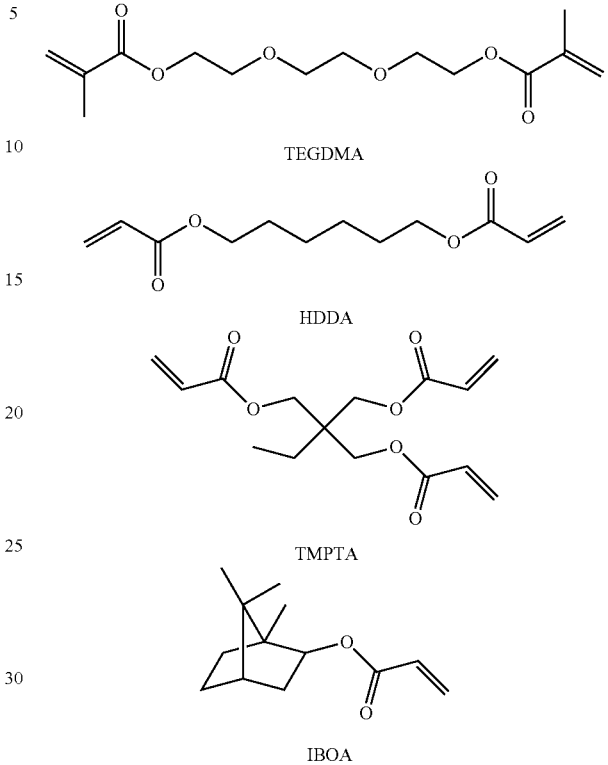

TEGDMA

HDDA

TMPTA

IBOA

The acrylate and methacrylate monomers may be selected from: 1,6-haxanediol diacrylate (HDDA), urethane dimethacrylate (Ebecryl 4859), triethylene glycol dimethacrylate (TEGDMA), and ethylene glycol dimethacrylate (EGDMA).

It may be that the formulation comprises at least one monomer with at least one heterocyclic moiety, preferably an oxygen containing moiety, that can be polymerised by a cationic polymerisation. The heterocyclic moiety may be an epoxide, an oxetane, a tetrahydrofuran, a tetrahydropyran, a lactone or a lactam.

The monomeric species is present in a total amount of 20-90 wt %. It may be that the total amount of oligomeric species with at least one heterocyclic moiety is present at between 25-75 wt %. It may be that the total amount of oligomeric species which is polymerisable via a cationic polymerisation is between 35-70 wt %. It may be that the total amount of oligomeric species comprising at least one heterocyclic moiety is present in the formulation is 40-65%.

It may be that the total amount of monomeric species which is polymerisable via a cationic polymerisation is between 20-90%. It may be that the total amount of monomeric species that can be polymerised via a cationic polymerisation is 20-60%. It may be that the total amount of monomeric species with at least one heterocyclic moiety is 25-45%.

The monomers and oligomers that are polymerisable via cationic polymerisation may be chosen from this list: allyl glycyl ether, bis[4-glycidyloxy)phenyl]methane, 1,3-butadiene diepoxide, 1,4-butanediol diglycidyl ether, butyl glycyl ether, tert-butyl glycidyl ether, 4-chlorophenyl glycidyl ether, cyclohexene oxide, cyclopentene oxide, dicylopentene oxide, dicyclopentene dioxide, 1,2,5,6-diepoxycyclooctane, 1,2,7,8-diepoxyoctane, diglycidyl 1,2-cyclohexanedicarboxylate, N,N-diglycidyl-4-glycidyloxyaniline, 1,2-diepoxybutane, cis-2,3-epoxybutane, 3,4-epoxy-1-butene, 3,4-epoxycyclohexylmethyl 3,4-epoxycyclohexanecarboxylate, 1,2-epoxydodecane, 1,2-epoxyhexadecane, 1,2-epoxyhexane, 1,2-epoxy-5-hexene, 1,2-epoxy-2-methylpropane, exo-2,3-epoxynorbornane, 1,2-cyclooctane, 1,2-diepoxypentane, 1,2-epoxy-3-phenoxypropane, (2,3-epoxypropyl) benzene, 1,2-epoxytetradecane, 2-ethylhexyl glycidyl ether, furfuryl glycidyl ether, glycerol diglycidyl ether, glycidyl hexadecyl ether, glycidyl isopropyl ether, glycidyl 4-methoxyphenyl ether, glycidyl 2-methylphenyl ether, isophrone oxide, 4,4'-methylenebis(N,N-diglycidylaniline), 2-methyl-2-vinyloxirane, neopentyl glycol diglycidyl ether, octyl glycidyl ether, decyl glycidyl ether, α-pinene oxide, propylene-oxide, resorcinol diglycidyl ether, styrene oxide, tris(2,3-epoxypropyl) isocyanurate, tris(4-hydroxyphenyl) methyl triglycidyl, 1,2-butylene oxide, 2,2'-{[(propane-2,2-diyl bis(cyclohexane-1,3-diyl))bis(oxy)] bis(methylene)] bis (oxyrane)}, 3-oxetanone, 3-bromooxetane, 3-iodooxentane, trimethylene oxide, 3-hydroxyoxetane, 3-aminooxetane, β-butyrolactone, oxetane-3-carboxylic acid, 3-aminooxetane-3-carboxylic acid, oxetane-3-methanol, 3-(aminomethyl) oxetane, 3-amino-3-methyloxetane, N-methyl-3-aminooxetane, 2-(3-oextanylidine) acetonitrile, 3-methyl-3-oxetanecarboxaldehyde, 3-methyloxetane-3-carboxylic acid, 3-bromomomethyl-3-methyloxetane, 3,3-dimetheyloxetane, 3-methyl-3-oxetanemethanol, 1-(3-methyloxetan-3-yl)methanamine, 3-ethyl-3-oxetanemethanol, 3-(phenxymethyl)-3-oxetanylamine, bis[4-(glycidyloxyl) phenyl]methane and oligomers thereof. A selection of suitable monomers that can be polymerised using a cationic photopolymerisation mechanism are shown here:

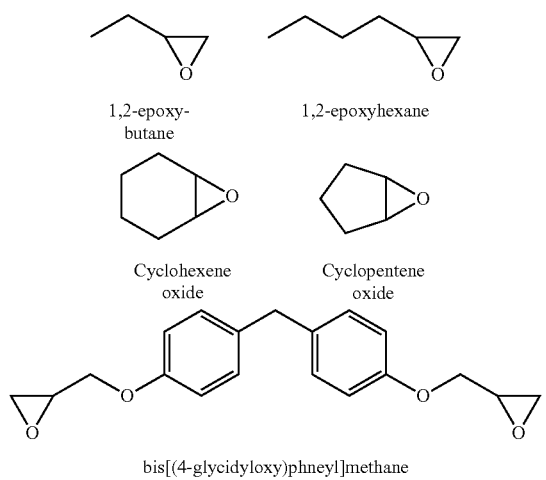

1,2-epoxy-butane
1,2-epoxyhexane
Cyclohexene oxide
Cyclopentene oxide
bis[(4-glycidyloxy)phneyl]methane The monomers and oligomers that are polymerisable via cationic polymerisation may be chosen from: 3,3-diemtheyloxetane, 1,2-diepoxypentane, 3-hydroxyoxetane, 1,2-epoxyhexane, and bis[4-(glycidyloxyl)phenyl]methane.

It may be that the blue-light photoinitiator with absorption in the region between 300 nm to 475 nm is present from 0.5-10 wt %. It may be that the total amount of blue-light photoinitiator present is between 0.25-2.5 wt %. The blue-light photoinitiator may be selected from: Anthraquinone, anthraquinone-2-sulfonic acid, (benzene) tricarbonyl chromium, benzyl, benzophenone, benzophenone/1-hydroxycylohexyl phenyl ketone blends, 3,3',4,4'-benzoohenonetetracarboxylic acid dianhydride, 4-benzoylbisphenyl, 2-benzyl-2-(dimethylamino)-4'-morpholinobutyrophenone, 4,4'-bis (dimethylamino)benzophenone, camphorquinone, 2-chlorothioxanthen-9-one, dibenzosuberenone, 2,2'-diethoxyacetophenone, 4,4'-dihydroxybenzophenone, 4-dimethylaminobenzophenone, 2,5-diemthylbenzophenone, diphenyl(2,4,6 trimethylbenzoyl) phosphine oxide/2-hydroxy-2-methylpropiophenone blends, ethylanthraquinone, 3'-hydroxyacetophenone, 3-hydroxybenzophenone, 4-hydroxbenzophenone, thioxanthene-9-one, triarylsulfonium hexafluoroantimonate salts, triarylsulfonium hexafluorophosphate salts, methylbenzoylformate, 2-methyl-4'-(methylthio)-2-morpholinopropiophenone, 1-benzyl-2,N,N-dimethylamino-1-(4-morpholinophenyl)-1-butanone, phenanthrenequinone, 1,-hydroxy-cyclohexyl phenyl ketone, oxy-phenyl-acetic acid 2-[2 oxo-2-phenyl-acetoxyethoxy]-ethyl ester, diphenyl(2,4,6-trimethylbenzoyl) phosphine oxide, phenyl bis(2,4,6-trimethylbenzoyl) phosphine oxide, diphenyl[3-(phenylsulfanyl)phenyl] sulfanium hexafluorophosphate, diphenyl [2-(phenylsulfanyl)phenyl] sulfonium hexafluorophosphate. and tetramesitylporphyrin cobalt. The blue-light photoinitiator may also be a titanocene species and may selected from: bis($\eta^5$-2,4-cylopendien-1-yl)bis[2,6-difluoro-3-(1H-pyrrol-1-yl)phenyl]titanium (IV), titanocene bis(trifluoromethanesulfonate), titanocene dichloride, (indenyl) titanium (IV) trichloride, (pentamethylcyclopentadienyl) titanium (IV) trichloride, cyclopentadienyltitanium (IV) trichloride, bis(cyclopentadienyl) titanium (IV) pentasulfide, (4R, 5R)-chloro-cylopentadienyl-[2,2-dimethyl-1,3-dioxalan-4,5-bis(diphenylmethoxy)]titanium (IV), (4R, 5S)-chloro-cylopentadienyl-[2,2-dimethyl-1,3-dioxalan-4,5-bis(diphenylmethoxy)]titanium (IV) and mixtures thereof. Preferably the titanocene is bis($\eta^5$-2,4-cyclopentadien-1-yl)-bis(2,6-difluoro-3-(1H-pyrrol-1-yl)-phenyl) titanium (IV).

The blue-light photoinitiator may be selected from: 2-methyl-4'-(methylthio)-2-morpholinopropiophenone, bis ($\eta^5$-2,4-cyclopentadien-1-yl)-bis(2,6-difluoro-3-(1H-pyrrol-1-yl)-phenyl), 3-hydroxybenzophenone, 4-dimethylaminobenzophenone, and diphenyl[3-(phenylsulfanyl)phenyl] sulfanium hexafluorophosphate.

The blue-light photoinitiator may be a carbazole derivative and chosen from: 1,4-dimethyl-9H-carbazole-carbazole-9carbaldehyde, 1,4-dimethyl-9H-carbazole-3-carbaldehyde, 9-ethyl-1,4-dimethyl-9H-carbazole, N-(2,2-diethoxyethy)-N-[(1,4-dimethyl-9H-carbazol-3-yl)methyl] benzenesulfonamide, 2,2-diethoxy-N-[(9-ethyl-1,4-dimethyl-9H-carbazol-3-yl)methyl]ethan-1-amine, 9-ethyl-1,4-dimethyl-9H-carbazole-3-carboxaldehyde, N-(2,2-diethoxyethyl)-N-[(9-ethyl-1,4-dimethyl-9H-carbazol-3-yl) methyl]-4-methyl-benzenesulfonamide.

The blue-light photoinitiator may be a ferrocenium salt, preferably ($\eta^6$-3-benzoyl-4-chlorodiphenylamine)($\eta^5$-cyclopentadienyl) iron hexafluorophosphate and ($\eta^5$-2,4-cyclopentadien-1-yl) [($\eta^6$-1-methyl ethyl)benzene] iron hexafluorophosphate.

The blue-light photoinitiator may be a fluorone derivative, selected from: 3-butoxy-5,7-diiodo-6-fluorone, 3-ethoxy-5,7-diiodo-6-flurone and 9-cyano-3-butoxy-5,7-diiodo-6-fluorone. A selection of suitable blue-light photoinitiators are shown here:

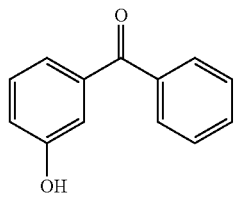
3-hydroxybenzophenone

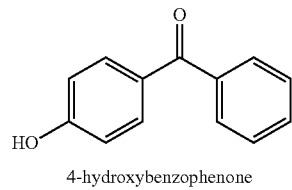
4-hydroxybenzophenone

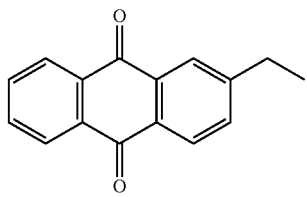
Ethyanthraquinone

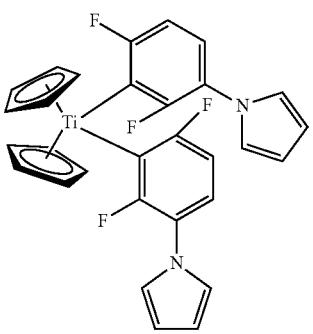
bis(η⁵-2,4-cyclopentadien-1-yl)-
bis(difluoro-1-(1H-pyrrol-1-yl)
phenyl)titanium

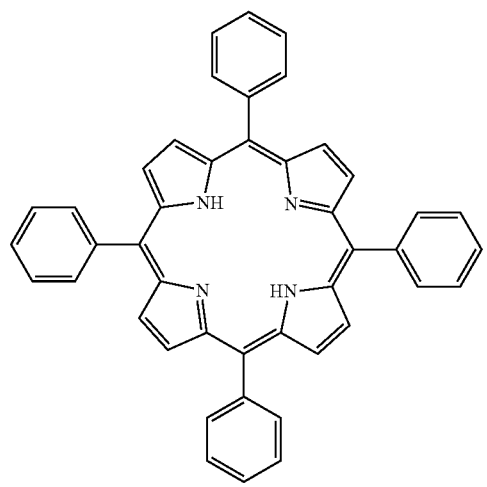
Tetraphenylporphyrin

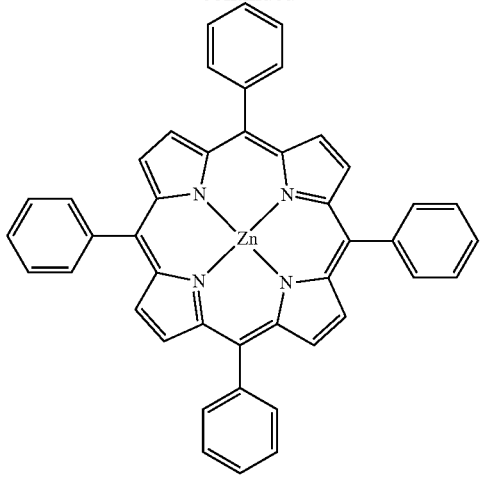
Zinc tetraphenylporphyrin

It may be that the green-light and red-light photoinitiator, with an absorption maximum in the region of 520 nm to 660 nm is present from 0.5-12 wt %. It may be that the green-light and red-light photoinitiator is present from 2-6 wt %. The green-light and red-light photoinitiators may be selected from: 1-amino-4-anilinoanthraquinone, 1,4-bis(p-tolylamino)anthraquinone, 1,4-bis(pentylamino)anthraquinone, 1-amino-4-hydroxyanthraquinone, 1,4-diaminoanthraquinone, 1,5-diaminoanthraquinone, tetraphenylporphyrin, tetra-o-tolylporphyrin, tetrakis(2,6-dimethylphenyl)porphyrin, tetramesitylporphyrin, tetrakis(2,6-diisopropylphenyl)porphyrin, tetrakis(2-chlorophenyl)porphyrin, tetrakis(2-bromophenyl)porphyrin, tetra(naphthalen-2-yl)porphyrin, zinc tetraphenylporphyrin, zinc tetra-o-tolylporphyrin, zinc tetrakis(2,6-dimethylphenyl)porphyrin, zinc tetramesitylporphyrin, zinc tetrakis(2,6-diisopropylphenyl)porphyrin, zinc tetrakis(2-chlorophenyl)porphyrin, zinc tetrakis(2-bromophenyl)porphyrin, zinc tetra(naphthalen-2-yl)porphyrin, eosin Y, 2-octanoyl-4,5,7-triiodo-3-hydroxy-6-fluorone, 9-cyano-2-octanoyl-4,5,7-triiodo-3-hydroxy-6-fluorone, 2-octyl-4,5,7-triido-3-hydroxy-6-fluorone, 9-cyano-2-octyl-4,5,7-triido-3-hydroxy-6-fluorone, 3,3-[(dimethyl-1-propylindolin-2-ylidene)penta-1,3-dien-1-yl]-1,1-diemthyl-3-pentyl-1H-benzoindol-3-ium butyltriphenylborate, 1,3-[(dibutyl-3,3-dimethylindolin-2-ylidene)penta-1,3-dien-1-yl]-1,1-diemthyl-1H-benzoindol-3-ium butyltriphenylborate, {[(2-chloro-1,3,3-trimethyl-2-ylidene)ethylidene]cyclohe-1-en-1-yl}vinyl-1,3,3-trimethyl-1H-benzoindol-3-ium butyltriphenylborate, [2-chloro-(1,3,3,-trimethyl-1,3-dihydro-2H-benzoindole-2-ylidene)cyclohex-1-en-1-yl]vinyl-1,3,3-trimethyl-1H-benzoindol-3-ium. Preferably, the red-light photoinitiator is a combination of tetraphenylporphyrin and zinc tetraphenylporphyrin.

The green-light and red-light photoinitiators may be selected from: tetraphenylporphyrin, zinc tetraphenylporphyrin, 9-cyano-2-octanoyl-4,5,7-triiodo-3-hydroxy-6-fluorone, and eosin Y.

It may be that the co-initiator is present from 1-18 wt %. It may be that the co-initiator is present in from 2-12%. It may be that the total amount of co-initiator present is from 2-6%.

The co-initiator may be selected from a family of organic thiols with the formula (XSY), where X is an organic moiety, Y is either a hydrogen atom, or an organic moiety and n is between 1-4. These will be referred to as thiols herein. The thiol may be selected from: 2-mercaptobenzoxazole, 2-mercaptobenzothiazole, 2-mercaptobenzimidazole, pentaerythritol tetrakis(mercaptoacetate), 4-acetamidothiophenol, mercaptosuccinic acid, dodecathiol, f3-mercaptoethanol, 6-ethoxy-2-mercaptobenzathiazole, 4-methyl-4H-1,2,4-triazole-3-thiol, 2-mercapto-1-methylimidazole, 2-mercapto-5-1,3,4-thiadiazole, 5-N-butylthio-2-mercapto-1,3,4-thiadiazole, 4-methoxybenzene thiol, 2-phenyl-1H-tetrazole-5-thiol, 4-phenyl-4H-1,2,4-triazole-3-thiol, pentaerythriol tetrakis(3-mercaptopropionate), trimethylolpropane-tris(mercaptoacetate), 2-mercaptopyridine, 4-mercaptopyridine, 2-mercapto-3H-quinazoline and 2-mercaptothiazoline, or a mixture thereof.

The co-initiator may be selected from: dodecathiol, pentaerythritol tetrakis(mercaptoacetate), β-mercaptoethanol, and triethanolamine, The co-initiator may be selected from a family of organic amines with the formula X(NYR), where X is an organic moiety, Y and R are either a hydrogen atom or an organic moiety and n is between 1-4. These are referred to amines herein. The amine may be selected from: allylamine, 2,2-bis(aminoethoxy)propane, 4-chloro-o-pehnylenediamine, 1,3-cyclohexanebis(methylamine), 1,3-diaminoacetone, 1,4-diaminoanthraquinone, aniline, 1,5-diamino-methylpentane, 1,9-diaminononane, 2,4-diaminotoluene, 2,6-diaminotoluene, diaminoethane, 1,3-diaminopropane, iso-propyl diamine, 2,2'-(ethylenedioxy)bis(ethylamine), 4,4'-methylenebis(2,6-diethylaniline), 3,3'-methylenedianiline, triethanolamine, triethylamine, tris(2-aminoethyl)amine, N,N'-diisopropylethylenediamine, N,N'-diisopropyl-1,3-propanediamine, N,N'-dimethyl-1,3-propanediamine, 4,4'-bis(diethylamino)benzophenone, 4-(diethylamino)benzophenone, 2-(diethylamino)ethyl acrylate, 2-(diethylamino)ethyl methacrylate, 3-(dimethylamino)propyl acrylate, ethyl 4-(dimethylamino)benzoate, 2-dimethylamino-ethylbenzoate, isoamyl-4-(dimethylamino)benzoate, 2-ethylhexyl 4-(dimethylaminobenzoate) and Michler's ketone.

The co-initiator may be selected from a family of organic triazine 1,3,5-triazines with a $CX_3$, or an Ar—$CX_3$ substituent, where X is a halogen atom selected among Cl, Br, I, preferably a chlorine and Ar is an aromatic, or heteroaromatic substituent. The triazine co-initiator may be selected from: 2-phenyl-4,6-bis(trichloromethyl)-s-triazine, 2,4,6-tris(trichloromethyl)-s-triazine, 2-(p-methoxystyryl)-4,6-bis(trichloromethyl)-s-triazine, 2-(styryl-4,6-bis(trichloromethyl)s-triazine, 2-(p-methoxystyryl)-4,6-bis(trichloromethyl)-s-triazine, 2-(4-methoxy-naphtho-y-yl)-4,6-bis(trichloromethyl)-s-triazine and 2-[4-(2-thoxyethyl)-naphtho-1-yl]-4,6-bis(trichloromethyl)-s-triazine.

The 'organic moiety X' can be a hydrocarbyl group, or a group of hydrocarbyl groups with or without heteroatoms. The hydrocarbyl group may be selected from: alkyl group, cyclohexyl group, cyclopentyl group, benzyl group, aromatic group, polyaromatic group, heteroaromatic group. Any of these groups can be substituted, or linked by an aldehyde group, a halogen atom, nitrogen atom, a sulfur atom, a ketone group, a carboxylate group, an ester group, an ether group, a thioether group, an amine group, or an amide group.

The co-initiator may be selected from the family of organic, aromatic or heteroaromatic iodonium salts: bis(2,4,6-trimethylpyridine)iodonium hexaflurophosphate, bis(4-tert-butylphenyl)iodonium hexafluorophosphate, bis(pyridine)iodonium hexafluorophosphate, bis(pyridine)iodonium tetrafluoroborate, bis(4-bromophenyl)iodonium trifluoromethansulfonate, bis(2,4,6-trimethylphenyl)iodonium trifluoromethansulfonate, [4-(bromomethyl)phenyl](2,4,6-trimethoxyphenyl)iodonium-p-toluenesulfonate, bis(4-fluorophenyl)iodonium trifluoromethansulfonate, (3-bromophenyl)(mesityl)iodonium trifluoromethansulfonate, 4-biphenylyl(2,4,6-trimethoxyphenyl)iodonium trifluoromethansulfonate, diphenyliodonium hexafluorophosphate, dipehnyliodonium perchlorate, diphenyliodonium hexafluoroarsenate, diphenyliodonium trifluoromethansulfonate, diphenyliodonium chloride, diphenyliodonium nitrate, diphenyliodonium bromide, diphenyliodonium iodide, diphenyliodonium-2-carboxylate monohydrate, (3,5-dichlorophenyl)(2,4,6-trimethoxyphenyl)iodonium p-toluenesulfonate, ethyl(phenyl)iodonium tetrafluoroborate, (5-fluoro-2-nitrophenyl)(2,4,6-trimethoxyphenyl)iodonium p-toluenesulfonate, [4-fluoro-3-(trifluoromethyl)phenyl](2,4,6-trimethoxyphenyl)iodonium p-toluenesulfonate, 4-isopropyl-4'-methyldiphenyliodonium tetrakis(pentafluorophenyl)borate, (2-methylphenyl)(2,4,6-trimethylphenyl)iodonium trifluoromethanesulfonate, (3-methylphenyl)(2,4,6-trimethylphenyl) iodonium trifluoromethansulfonate, (4-methylphenyl)(2,4,6-trimethylphenyl)iodonium trifluoromethansulfonate, (4-nitrophenyl)iodonium trifluoromethansulfonate, (perfluorohexyl)phenyliodonium trifluoromethansulfonate, (perfluoro-n-octyl)phenyliodonium trifluoromethansulfonate, (perfluoropropyl)phenyliodonium trifluoromethansulfonate, trimethylsilylethynyl(phenyl)iodonium tetrafluoroborate, phenyl[2-(trimethylsilyl)phenyl]iodonium trifluoromethanesulfonate, phenyl(2,4,6-trimethoxyphenyl)iodonium p-toluenesulfonate and phenyl[3-(trifluoromethyl)phenyl) iodonium trifluoromethanesulfonate. Preferably, the formulation will comprise a co-initiator from the family of thiols, or amine acrylates and a co-initiator from selected from the list of iodonium salts.

The co-initiator may be selected from: diphenyliodonium hexafluorophosphate, bis(4-tert-butylphenyl)iodonium hexafluorophosphate, bis(pyridine)iodonium hexafluorophosphate, bis(pyridine)iodonium tetrafluoroborate, triethylamine, and diphenyliodonium trifluoromethansulfonate.

Certain formulations of the invention comprise:
25-65% epoxy acrylate oligomer with at least one carbon-carbon double bond;
35-65% monomeric species with at least one carbon-carbon double bond;
15-60% monomeric species with at least one oxygen containing heterocyclic moiety;
0.75-5% at least one thiol or amine co-initiator;
1-10% at least one iodonium salt co-initiator;
0.5-3% a blue light-photoinitiator (e.g. bis($\eta^5$-2,4-cyclopentadien-1-yl)-bis(2,6-difluoro-3-(1H-pyrrol-1-yl)-phenyl)titanium) and
1-8% a red light photoinitiator e.g. zinc tetraphenylporphyrin.

Certain formulations of the invention comprise:
30-45% epoxy acrylate oligomer with at least one carbon-carbon double bond;
45-70% monomeric species with at least one carbon-carbon double bond;
10-55% monomeric species with at least one oxygen containing heterocyclic moiety;
0.5-4% at least one thiol or amine co-initiator;
1-5% at least one iodonium salt co-initiator;
1-5% a blue light-photoinitiator (e.g. bis($\eta^5$-2,4-cyclopentadien-1-yl)-bis(2,6-difluoro-3-(1H-pyrrol-1-yl)-phenyl)titanium) and 3-9% a red light photoinitiator e.g. zinc tetraphenylporphyrin.

Certain formulations of the invention comprise:
10-25% epoxy acrylate oligomer with at least one carbon-carbon double bond;
25-75% monomeric species with at least one carbon-carbon double bond;
35-65% monomeric species with at least one oxygen containing heterocyclic moiety;
1-7% at least one thiol or amine co-initiator;
3-7% at least one iodonium salt co-initiator;
1-5% a blue light-photoinitiator (e.g. bis($\eta^5$-2,4-cyclopentadien-1-yl)-bis(2,6-difluoro-3-(1H-pyrrol-1-yl)-phenyl)titanium) and
4-10% a red light photoinitiator e.g. zinc tetraphenylporphyrin.

The formulation may further comprise at least one pigment or dye. The formulation may comprise at least one stabiliser that prevents spontaneous polymerisation of the formulation in the dark and overexposure during normal operation. The formulation may comprise at least one stabiliser that prevents degradation of the cured photopolymer afterwards when subjected to UV light.

The formulation may comprise at least one, micron or nanometre sized filler material for altering thermal or mechanical properties of the photopolymer resin. Filler materials can include, but are not limited to: ceramic (alumina, silica, hydroxyapatite, carbon nitride, boron nitride, silicon carbide, etc), metal (cobalt, nickel, aluminium, stainless steel, titanium and alloys thereof), glass, rubber and polymer particles. These can include coated particles and core-shell particles.

The formulation is preferably suitable for the use in the formation of a 3D object when exposed to two different wavelengths, preferably in the UV/blue region of the spectrum and one in the green, orange or red region of the light spectrum. The light is emitted from a visual display screen. Thus, the photopolymer formulation is preferably suitable for the formation of a 3D object when exposed to two different wavelengths through a visual display screen.

Herein described is a method for creating a 3D object, the method comprising the formation of more than two layers of a cured photopolymer by exposing a liquid photopolymer resin comprising at least two different photoinitiators to the light emitted by a visual display screen. Said screen has the capability of emitting light with two different, non-overlapping wavelengths through control of blue, green and red subpixels or the whole pixels in a monochrome screen, herein referred to as light spectrum 1 and light spectrum 2.

The visual display screen or emissive pixel array may be of a number of types; Liquid Crystal Display (LCD), Light emitting Diode (LED), Electronic paper (E Ink), Electroluminescent display (ELD), Plasma Display Panel (PDP) or Organic Light-emitting Diode Display (OLED). This list is not limiting in its scope in terms of the invention and indeed any device which emits digitally controllable light can be used in this invention, the preferred choice of visual display screen however is LCD in format. For simplicity we will use the term LCD screen to refer to the visual display screen used in a non-limiting manner afterwards.

An LCD typically consists of an array of pixels. Each pixel consists of a layer of liquid crystal molecules aligned between two transparent electrodes and two polarizing filters (parallel and perpendicular), the axes of transmission of which are, in most of the cases, perpendicular to each other. Before an electric field is applied, the orientation of the liquid crystal molecules is commonly twisted, the surface alignment directions at the two electrodes are perpendicular to each other and so the molecules arrange themselves in a helical structure. By controlling the voltage applied across the liquid crystal layer in each pixel, light can be allowed to pass through in varying amounts thus creating different levels of light transmission.

It may be that the visual display screen has 150 pixels per inch or greater. It may be that the visual display screen has 250 pixels per inch or greater. It may be that the visual display screen has 500 pixels per inch or greater. It may be that the visual display screen has a ratio of its contrast ratio to its luminescence that is above 1.0.

The length of time that the screen illuminates the image is determined by two factors; the rate of curing of the photopolymer and the intensity of light being emitted from the screen thus curing it. It is therefore desirable to reduce the exposure time by increasing the intensity of the light transferred through the array.

In some cases, this type of visual display screen 3D printer utilises the screen as it was intended, but in most cases the printer manufacturer removes the backlight and rear panel and lights it directly from behind the array. In the case of LCD screen assemblies, they remove the LED backlight generating visible light from 400 nm to 700 nm and replace it with LEDs directly behind the array emitting light that is as collimated as possible. This in effect uses the LCD nematics as an array of individually controllable masks to either untwist and allow the light through or remain twisted to prevent it. The screens can be monochrome or colour and composed of sets of blue, green and red subpixels or other colours. The wavelengths can be visible or predominantly long wavelength UVA overlapping into the blue part of the visible spectrum. The intensity can be much brighter than would be intended for human viewing where typically 350-500 nits (candela/m$^2$) is used for normally lit environments and 800-1000 nits is used for sunlit ones, in practice there is no limit to light emitted from the array, it being dependent upon the power of the lighting array behind it, the loss in contrast ratio as the intensity is increased and the maximum tolerable level of heat or UV for the screen or the resin. LCD screens are reliable and if lit at the correct wavelength, intensity and in the absence of significant heat generation, are very long lasting, generating reliable images for over 30,000 hours, far longer than lasers or DLPs.

The printers can be orientated such that the photopolymer is contained in a vat that is above the screen, either in contact with it or separated by a gap from it, in this case the platform moves from the bottom upwards as it prints—known as bottom-up or reverse SLA. In the case of this bottom up orientation the vat must have a light transmitting lower layer which can be a film which provides the properties of being very low surface energy to reduce sticking and have high light transmittance with low haze to reduce refraction. Typically, these films are made of Polymethylpentene (PMP), Fluorinated IEthylene Propylene (FEP), Perfluroalkoxy (PFA), Ethylene Chlorotrifluoroethylene) ECTFE, Polyvinylidene Fluoride (PVDF), Polypropylene (PP), polyester (PET) or other clear films suitable for the purpose. These films may be monofilms or co-extrusions, laminates or can be surface treated with chemicals to reduce the surface energy such as silanes, silicones, silsesquioxanes and the like. There are in fact many films that can be used successfully with this type of printing and this list is not exhaustive. It is possible to use a thin sheet of glass as the base of the vat and then to prevent the high adhesion that glass would provide to the curing layer of photopolymer because of its high surface energy by coating it in a release compound such as silicone, desirably this is Polydimethylsiloxane (PDMS) such as Sylgard® 184 manufactured by Dow Chemical company.

Alternatively, it is possible to orientate the vat below the screen such that the platform starts at the top and moves downwards through the process of the print, known as top-down or conventional SLA. In this case, as with bottom-up, the screen can either be in contact with the resin or have a separation gap filled with a release medium such as air.

The printers typically have one linear rail which will provide accurate, repeatable motion in the z-axis of 100 microns, preferably 50 microns or even 25 microns. There is no particular requirement for the construction or number of these drives, it is possible to have two drives at opposite sides of the build platform, nor is there any specific requirement for the construction of the drive. It can be moved by slider, lead screw, belt or other method. A suitable drive unit would be the Nema 17 stepper motor with 8 mm lead screw and a 1 mm pitch attached at right angles to the support plate that houses the visual display screen.

The photopolymer can be of any type that will harden with light in the intensity and wavelength of the light spectrum emitted by the LCD screen. It can be acrylate, epoxy based or other form of chemistry. It can be free radically cured or cationically cured. The unreacted liquid photopolymer that remains in the vat after the object has been made can be re-used. The part is them drained and washed in a solvent which could be any suitable solvent. After cleaning, a post processing procedure involving blanket illumination of light, under water exposure or optionally heat is necessary to fully harden the object and leave it dry to touch.

DESCRIPTION OF THE DRAWINGS

Examples are further described hereinafter with reference to the accompanying drawings.

DETAILED DESCRIPTION

Figure 1:
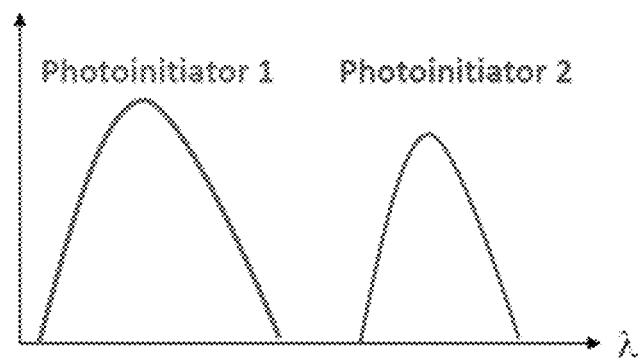
FIG. 1 describes the emission spectra of two distinct photoinitiators, 1 and 2, where there is an area of no activity in between them.
Figure 2:
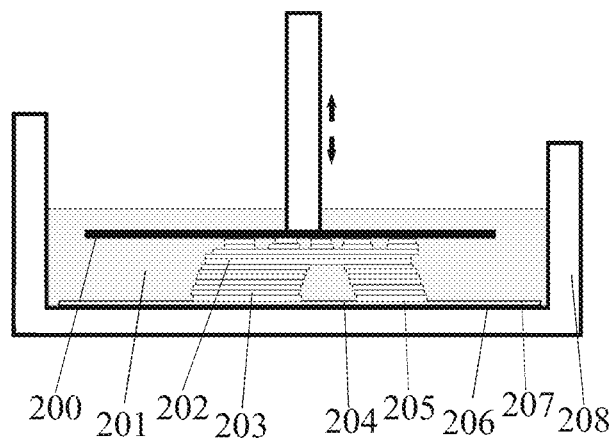
FIG. 2 describes a standard configuration of LCD screen-based 3D printers where the machine consists of the build platform (200) that the object (202) is grown upon from liquid photopolymer (201) held in a vat (208). The build platform is able to move vertically up and down in the vat. Here the LCD screen consists of pixels which are open (205) which allow light to pass through and polymerise the photopolymer above them and pixels which are closed (204) which prevent light from passing through and keeping the photopolymer liquid above them. The LCD screen can optionally be back-lit by an array to increase the intensity, change the wavelength or collimate the light passing through the array (206) and can be protected by a protective film (207).
Figure 3:
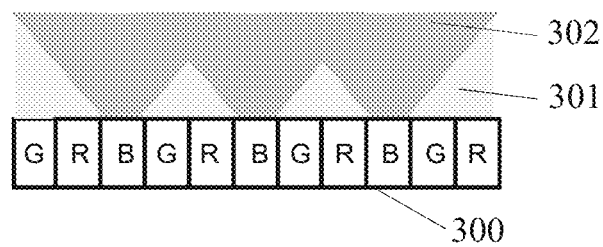
FIG. 3 describes a configuration where the conventional colour LCD array (300) is backlit with white light and only the blue sub-pixel is creating polymerisation. This is the normal operating situation when operating with blue-light photoinitiators such as titanocene. Here the light is emitted from the blue sub-pixel at an angle, known as the viewing angle and meets to form an even intensity of light at a focal plane which at which polymerisation (302) will take place from liquid resin (301).

This invention utilises novel photopolymer formulations which comprise organic components polymerisable via a radical polymerisation and organic components polymerisable via a cationic mechanism. Said formulation further comprises 2 different photoinitiator systems, one of which absorbs light in the UV to blue region of the light spectrum, herein referred to as 'blue-light photoinitiator' and a second photoinitiator which absorbs in the green, orange or red region of the light spectrum, herein referred to as 'red-light photoinitiator'. The absorption spectra of said photoinitiators are complementary and not-overlapping, herein referred to as 'spectrum 1' and 'spectrum 2'. Thus, by using the blue and red subpixel of the LCD screen, one or the other photoinitiator can be activated selectively, leading to a either a radical, or cationic polymerisation mechanism. This multicolour, multi-wavelength method allows for the fabrication of layers with different materials and therefore different mechanical properties, depending on the wavelength used.

The length of time that the screen illuminates the image is determined by the rate of curing of the polymer and the intensity of the light being emitted from the screen, thus curing it. It is desirable that the required cure time is as short as possible, typically a number from 1-120 seconds, more typically from 3-45 seconds. The length the screen illuminates a given image may differ for the illumination using the red and the blue subpixel. It is highly desirable that this exposure time is as short as possible, as one of the accepted drawbacks of 3D printing is the long time required for the fabrication of objects.

Typically, SLA 3D printers require a relatively low viscosity of the photopolymer resin to enable a new layer of liquid photopolymer coating to be applied evenly and quickly. Said viscosity may be less than 20,000 cPs at 25° C. and desirably less than 1000 cPs at 25° C. Commonly the viscosity of the photopolymer formulation will be between 300 cPs-850 cPs.

A combination of an oligomer or monomer with at least one carbon-carbon double bond, polymerisable via a radical polymerisation mechanism and an oligomer or monomer with at least one heterocyclic moiety, preferably an oxygen containing entity, such as an oxetane, epoxide, or lactone, are suitable as a base for the formulations of this invention. The photopolymer, polymerisable via a radical mechanism is typically a urethane acrylate or an epoxyacrylate, but could be any other compound activated and polymerisable by radical species. The photopolymer, polymerisable via a cationic mechanism is typically and organic moiety containing at least one oxetane, epoxide or lactone moiety, but could be any moiety that is polymerisable via a cationic mechanism when illuminated. The photopolymer may be created by combining urethane acrylate oligomers with oxetane monomers, reactive diluents, photoinitiators and co-initiators. Preferably the photopolymer will be created by combining a urethane acrylate oligomer, a monomer containing at least one acrylate group with a viscosity of less than 100 cPs, an aliphatic oxetane monomer, a blue-light photoinitiator, a red-light photoinitiator, a thiol-based co-initiator and an iodonium salt co-initiator. The blue-light photoinitiators have the ability to absorb either in the UV, or the visible region of the electromagnetic spectrum and pass the energy on, typically as free radicals. The red-light photoinitiators have the ability to absorb in the orange and red region of the electromagnetic spectrum and pass the energy on, typically as cations. The concentrations of the blue-light and red-light photoinitiator have to be optimised, in order to achieve a maximum level of photosensitivity. This level is obtained by practical experimentation and can for example be from 0.25%-15% by weight and more commonly between 0.5%-5% wt. All percentages are calculated by weight of the total liquid photopolymer. It is desirable that the cure speed of the reaction is adjusted, so that the rate of growth is as fast as possible, while still being controllable. The rate of cure will determine the programmes time to expose light from a screen to harden a layer of the desired thickness in the apparatus.

The photopolymer formulation may further be created by combining a urethane acrylate oligomer, a monomer containing a at least one acrylate group with a viscosity of less than 100 cPs, an aliphatic oxetane monomer, a blue-light photoinitiator, a red-light photoinitiator, a thiol-based co-initiator and optionally an iodonium salt. The blue-light photoinitiators used in this formulation have the ability to absorb either in the UV, or visible region of the electromagnetic spectrum and pass the energy on as cations, thus leading to a cationic polymerisation of the respective monomers. The red-light photoinitiators have the ability to absorb in the orange and red region of the electromagnetic spectrum and pass the energy as free radicals. The concentrations of the blue-light and red-light photoinitiator have to be optimised, in order to achieve a maximum level of photosensitivity. This level is obtained by practical experimentation and can for example be from 0.25%-15% by weight and more preferably between 0.5%-5% wt. All percentages are calculated by weight of the total liquid photopolymer. It is desirable that the cure speed of the reaction is adjusted, so that the rate of growth is as fast as possible, while still being controllable. The rate of cure will determine the programmes time to expose light from a screen to harden a layer of the desired thickness in the apparatus.

Experimentation has shown that blue-light photoinitiators may be organic molecules containing aromatic chromophores, phosphine oxide photoinitiators or organometallic species. Said photoinitiators will be chosen depending on the wavelength determined for the radical polymerisation process. If the wavelength chosen is shorter than 380 nm, anthraquinone and benzophenone derivatives are the most suitable photoinitiators for this method. If the wavelength chosen for the radical photopolymerisation is between 381 and 450 nm, the photoinitiator will preferably be a phosphine oxide derivative. If the exposure wavelength chosen is between 455 nm and 495 nm, the photoinitiator will be an organometallic species, specially a metallocene species and most desirable a titanocene photoinitiator. Examples of suitable blue-light photoinitiators are anthraquinone, anthraquinone-2-sulfonic acid, (benzene) tricarbonyl chromium, benzyl, benzophenone, benzophenone/1-hydroxycylohexyl phenyl ketone blends, 3,3',4,4'-benzoohenonetetracarboxylic acid dianhydride, 4-benzoylbisphenyl, 2-benzyl-2-(dimethylamino)-4'-morpholinobutyrophenone, 4,4'-bis(dimethylamino)benzophenone, camphorquinone, 2-chlorothioxanthen-9-one, dibenzosuberenone, 2,2'-diethoxyacetophenone, 4,4'-dihydroxybenzophenone, 4-(dimethylamino)benzophenone, 2,5-diemthylbenzophenone, diphenyl(2,4,6 trimethylbenzoyl) phosphine oxide/2-hydroxy-2-methylpropiophenone blends, ethylanthraquinone, 3'-hydroxyacetophenone, 3-hydroxybenzophenone, 4-hydroxbenzophenone, thioxanthene-9-one, triarylsulfonium hexafluoroantimonate salts, triarylsulfonium hexafluorophosphate salts, methylbenzoylformate, 2-methyl-4'-(methylthio)-2-morpholinopropiophenone, 1-benzyl-2,N,N-dimethylamino-1-(4-morpholinophenyl)-1-butanone, phenanthrenequinone, 1,-hydroxy-cyclohexyl phenyl ketone, oxy-phenyl-acetic acid 2-[2 oxo-2-phenyl-acetoxyethoxy]-ethyl ester, diphenyl(2,4,6-trimethylbenzoyl) phosphine oxide, phenyl bis(2,4,6-trimethylbenzoyl) phosphine oxide, diphenyl[3-(phenylsulfanyl)phenyl] sulfanium hexafluorophosphate, diphenyl [2-(phenylsulfanyl)phenyl] sulfonium hexafluorophosphate. and tetramesitylporphyrin cobalt. The blue-light photoinitiator may also be a titanocene species and may selected from: bis($\eta^5$-2,4-cylopendien-1-yl)bis[2,6-difluoro-3-(1H-pyrrol-1-yl)phenyl]titanium (IV), titanocene bis(trifluoromethanesulfonate), titanocene dichloride, (indenyl) titanium (IV) trichloride, (pentamethylcyclopentadienyl) titanium (IV) trichloride, cyclopentadienyltitanium (IV) trichloride, bis(cyclopentadienyl) titanium (IV) pentasulfide, (4R, 5R)-chloro-cylopentadienyl-[2,2-dimethyl-1,3-dioxalan-4,5-bis(diphenylmethoxy)]titanium (IV), (4R, 5S)-chloro-cylopentadienyl-[2,2-dimethyl-1,3-dioxalan-4,5-bis(diphenylmethoxy)]titanium (IV) and mixtures thereof. Preferably the titanocene is bis($\eta^5$-2,4-cyclopentadien-1-yl)-bis(2,6-difluoro-3-(1H-pyrrol-1-yl)-phenyl) titanium (IV), which was manufactured by BASF under the tradename Irgacure 784. This photoinitiator reacts mainly to the photons emitted from the blue sub-pixels of an LCD screen.

The red-light photoinitiators for the cationic polymerisation process can be either an organic entity, containing at least one aromatic chromophore, preferably a diaminoanthraquinone derivative, or a flurone derivative. Experimentation has shown that the red-light photoinitiator can also be a coordination complex, specifically a porphyrin complex, preferably a zinc tetraphenylporphyrin. Examples of suitable red-light photoinitiators are 1-amino-4-anilinoanthraquinone, 1,4-bis(p-tolylamino)anthraquinone, 1,4-bis(pentylamino)anthraquinone, 1-amino-4-hydroxyanthraquinone, 1,4-diaminoanthraquinone, 1,5-diaminoanthraquinone, tetraphenylporphyrin, tetra-o-tolylporphyrin, tetrakis(2,6-dimethylphenyl)porphyrin, tetramesitylporphyrin, tetrakis(2,6-diisopropylphenyl)porphyrin, tetrakis(2-chlorophenyl)porphyrin, tetrakis(2-bromophenyl)porphyrin, tetra(naphthalen-2-yl)porphyrin, zinc tetraphenylporphyrin, zinc tetra-o-tolylporphyrin, zinc tetrakis(2,6-dimethylphenyl)porphyrin, zinc tetramesitylporphyrin, zinc tetrakis(2,6-diisopropylphenyl)porphyrin, zinc tetrakis(2-chlorophenyl)porphyrin, zinc tetrakis(2-bromophenyl)porphyrin, zinc tetra(naphthalen-2-yl)porphyrin, eosin Y, 2-octanoyl-4,5,7-triiodo-3-hydroxy-6-fluorone, 9-cyano-2-octanoyl-4,5,7-triiodo-3-hydroxy-6-fluorone, 2-octyl-4,5,7-triido-3-hydroxy-6-fluorone, 9-cyano-2-octyl-4,5,7-triido-3-hydroxy-6-fluorone, 3,3-[(dimethyl-1-propylindolin-2-ylidene)penta-1,3-dien-1-yl]-1,1-diemthyl-3-pentyl-1H-benzoindol-3-ium butyltriphenylborate, 1,3-[(dibutyl-3,3-dimethylindolin-2-ylidene)penta-1,3-dien-1-yl]-1,1-diemthyl-1H-benzoindol-3-ium butyltriphenylborate, {[(2-chloro-1,3,3-trimethyl-2-ylidene) ethylidene]cyclohe-1-en-1-yl}vinyl-1,3,3-trimethyl-1H-benzoindol-3-iumbutyltriphenylborate, [2-chloro-(1,3,3,-trimethyl-1,3-dihydro-2H-benzoindole-2-ylidene)cyclohex-1-en-1-yl]vinyl-1,3,3-trimethyl-1H-benzoindol-3-iumPreferably the red-light photoinitiator will be a porphyrin derivative, preferably tetraphenylporphyrin and zinc tetraphenylporphyrin. This photoinitiator reacts mainly to the photons emitted from the red sub-pixels of an LCD screen.

In the present invention the base of the photopolymer formulation may be any light reactive system, wherein one system is polymerisable via a radical mechanism using UV or blue-light herein referred to as a 'radical system' and the second system is polymerisable via a cationic mechanism using red-light, herein referred to as a 'cationic system'.

In the present invention the radical system is based on a light-curable photopolymer formulation, including, but not limited to urethane acrylate and epoxy acrylates. Thus, the base of the of the photopolymer resin will typically comprise one or more monomeric or oligomeric chemical species each comprising at least one carbon-carbon double bond which polymerisable via free radical polymerisation. The term 'oligomers' refers to low molecular weight polymers with a small number of repeat units, e.g. dimers, trimers, tetramers, pentamers, etc of monomers. These oligomeric species will not typically be formed from their constituent monomers using free radical polymerisation reactions. A urethane oligomer can be prepared by the reaction of a suitable polyol with an isocyanate.

Epoxy acrylates and methacrylates may be, but are not limited to epoxy(meth)acrylates of a polyepoxy compound such as poly(ethylene) glycol polyglycidiyl ether, propylene glycol, polypropylene glycol, polyglytcidyl ether, tetramethylene glycol polyglycidyl ether, (poly)tetramethylene glycol polyglycidyl ether, pentamethylene glycol polyglycidyl ether, (poly)pentamethylene glycol polyglycidyl ether, neopentyl glycol polyglycidyl ether, (poly)neopentyl glycol polyglycidyl ether, hexamethylene gycol polyglycidyl ether, (poly)hexamethylene gycol polyglycidyl ether, trimethylpropane polyglycidyl ether, (poly)trimethylpropane polyglycidyl ether, glycerol polyglycidyl ether, (poly)glycerol polyglycidyl ether, or sorbitol polyglycidyl ether, (poly) glycerol polyglycidyl ether with a hydroxy(meth)acrylate compound, such as hydroxymethyl (meth)acrylate or hydroxyethyl (meth)acrylate.

In the present invention the cationic system is based on a light-curable photopolymer formulation, including, but not limited to organic moieties containing a heterocyclic moiety, preferably an epoxide, oxetane or lactone with the general formula R-(het)$_n$, where R is an organic moiety, het is a heterocyclic moiety and n is between 1-4. The 'organic moiety R' can be a hydrocarbyl group, or a group of hydrocarbyl groups with or without heteroatoms. The hydrocarbyl group may be selected from: alkyl group, cyclohexyl group, cyclopentyl group, benzyl group, aromatic group, polyaromatic group, heteroaromatic group. Any of these groups can be substituted, or linked by an aldehyde group, a halogen atom, nitrogen atom, a sulfur atom, a ketone group, a carboxylate group, an ester group, an ether group, a thioether group, an amine group, or an amide group. Thus, the base of the photopolymer will comprise one or more monomeric or oligomeric species, each comprising at least one heterocycle, e.g. an epoxide, oxetane or lactone, which is polymerisable by cationic polymerisation.

Upon irradiation with UV light or blue-light the photopolymers of the radical system will undergo a chemical crosslinking process creating a cross-linked polymer network which is tough and resilient. The areas of photopolymer which aren't irradiated will remain liquid. Upon irradiation with red-light, the cationic system will undergo a chemical crosslinking, yielding a cross-linked polymer network, which is tough and resilient. The areas of photopolymer which aren't irradiated will remain liquid and can be removed and re-used after termination of the photopolymerization process.

An important aspect of this invention is the selective control of the radical and cationic polymerisation processes by using a multiwavelength 3D printer with two different light spectra for the fabrication of 3D objects. The radical polymerisation process won't be activated when irradiated with red-light and the cationic process won't be activated through irradiation with blue-light. Thus, two different materials based on two different formulations are polymerised by using blue and red light, respectively, yielding two different solid materials. The thermal and mechanical properties of these two solid materials, fabricated by irradiation with blue and red light, respectively, may be similar, or differ. This allows the selective printing of layers of a solid object displaying different types of thermal or mechanical properties.

Figure 8:
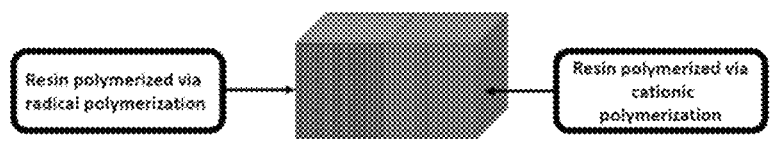
FIG. 8. is a schematic representation of 3D object created by irradiation with two different light spectra, depicting the layer by layer process.

FIG. 8. is a schematic representation of 3D object created by irradiation with two different light spectra, depicting the layer by layer process. The composition may contain certain reactive diluents to bring additional properties to the resin and reduce the viscosity. The formulation may contain certain unreactive diluents to reduce the viscosity of the resin. In certain embodiments, the composition further comprises one or more performance-enhancing additives, stabilisers, pigments, dyes, dispersing agents, thixotropic agents, ceramic and metal microparticles and nanoparticles and high molecular weight fatty acids. Examples of fatty acids which are particularly effective in ensuring a dry, tack-free surface after post-curing of the 3D include myristic acid.

It has been found that the rate of polymerisation can be greatly enhanced by the addition of at least one co-initiator, preferably two co-initiators. In the present invention, a co-initiator is a compound that can be activated by the activated photoinitiator to generate either free radicals, or cations. However, the co-initiator itself doesn't absorb light in the same range of the electromagnetic spectrum as the photoinitiator and isn't activated by light. Preferably, the photopolymer formulation will contain one co-initiator from the family of organic thiols, amines or triazines, herein referred to as 'radical co-initiator' and one co-initiator from the family of onium salts, herein referred to as 'cationic co-initiator' The radical co-initiator may be selected from: 2-mercaptobenzoxazole, 2-mercaptobenzothiazole, 2-mercaptobenzimidazole, pentaerythritol tetrakis(mercaptoacetate), 4-acetamidothiophenol, mercaptosuccinic acid, dodecathiol, β-mercaptoethanol, 6-ethoxy-2-mercaptobenzathiazole, 4-methyl-4H-1,2,4-triazole-3-thiol, 2-mercapto-1-methylimidazole, 2-mercapto-5-1,3,4-thiadiazole, 5-N-butylthio-2-mercapto-1,3,4-thiadiazole, 4-methoxybenzene thiol, 2-phenyl-1H-tetrazole-5-thiol, 4-phenyl-4H-1,2,4-triazole-3-thiol, pentaerythriol tetrakis (3-mercaptopropionate), trimethylolpropane-tris(mercaptoacetate), 2-mercaptopyridine, 4-mercaptopyridine, 2-mercapto-3H-quinazoline and 2-mercaptothiazoline, or a mixture thereof, allylamine, 2,2-bis(aminoethoxy)propane, 4-chloro-o-phenylenediamine, 1,3-cyclohexanebis(methylamine), 1,3-diaminoacetone, 1,4-diaminoanthraquinone, aniline, 1,5-diamino-methylpentane, 1,9-diaminononane, 2,4-diaminotoluene, 2,6-diaminotoluene, diaminoethane, 1,3-diaminopropane, iso-propyl diamine, 2,2'-(ethylenedioxy)bis(ethylamine), 4,4'-methylenebis(2,6-diethylaniline), 3,3'-methylenedianiline, triethanolamine, triethylamine, tris (2-aminoethyl)amine, N,N'-diisopropylethylenediamine, N,N'-diisopropyl-1,3-propanediamine, N,N'-dimethyl-1,3-propanediamine, 4,4'-bis(diethylamino)benzophenone, 4-(diethylamino)benzophenone, 2-(diethylamino)ethyl acrylate, 2-(diethylamino)ethyl methacrylate, 3-(dimethylamino)propyl acrylate, ethyl 4-(dimethylamino)benzoate, 2-dimethylamino-ethylbenzoate, isoamyl-4-(dimethylamino)benzoate, 2-ethylhexyl 4-(dimethylaminobenzoate), Michler's ketone,: 2-phenyl-4,6-bis(trichloromethyl)-s-triazine, 2,4,6-tris(trichloromethyl)-s-triazine, 2-(p-methoxystyryl)-4,6-bis(trichloromethyl)-s-triazine, 2-(styryl-4,6-bis(trichloromethyl)s-triazine, 2-(p-methoxystyryl)-4,6-bis(trichloromethyl)-s-triazine, 2-(4-methoxy-naphtho-y-yl)-4,6-bis(trichloromethyl)-s-triazine and 2-[4-(2-thoxyethyl)-naphtho-1-yl]-4,6-bis(trichloromethyl)-s-triazine.

The cationic co-initiator may be chosen from: bis(2,4,6-trimethylpyridine)iodonium hexaflurophosphate, bis(4-tert-butylphenyl)iodonium hexafluorophosphate, bis(pyridine) iodonium hexafluorophosphate, bis(pyridine)iodonium tetrafluoroborate, bis(4-bromophenyl)iodonium trifluoromethansulfonate, bis(2,4,6-trimethylphenyl)iodonium trifluoromethansulfonate, [4-(bromomethyl)phenyl](2,4,6-trimethoxyphenyl)iodonium-p-toluenesulfonate, bis(4-fluorophenyl)iodonium trifluoromethansulfonate, (3-bromophenyl)(mesityl)iodonium trifluoromethansulfonate, 4-biphenylyl(2,4,6-trimethoxyphenyl)iodonium trifluoromethansulfonate, diphenyliodonium hexafluorophosphate, dipehnyliodonium perchlorate, diphenyliodonium hexafluoroarsenate, diphenyliodonium trifluoromethansulfonate, diphenyliodonium chloride, diphenyliodonium nitrate, diphenyliodonium bromide, diphenyliodonium iodide, diphenyliodonium-2-carboxylate monohydrate, (3,5-dichlorophenyl)(2,4,6-trimethoxyphenyl)iodonium p-toluenesulfonate, ethyl(phenyl)iodonium tetrafluoroborate, (5-fluoro-2-nitrophenyl)(2,4,6-trimethoxyphenyl)iodonium p-toluenesulfonate, [4-fluoro-3-(trifluoromethyl)phenyl](2,4,6-trimethoxyphenyl)iodonium p-toluenesulfonate, 4-isopropyl-4'-methyldiphenyliodonium tetrakis(pentafluorophenyl)borate, (2-methylphenyl)(2,4,6-trimethylphenyl)iodonium trifluoromethanesulfonate, (3-methylphenyl)(2,4,6-trimethylphenyl) iodonium trifluoromethansulfonate, (4-methylphenyl) (2,4,6-trimethylphenyl)iodonium trifluoromethansulfonate, (4-nitrophenyl)iodonium trifluoromethansulfonate, (perfluorohexyl)phenyliodonium trifluoromethansulfonate, (perfluoro-n-octyl)phenyliodonium trifluoromethansulfonate, (perfluoropropyl)phenyliodonium trifluoromethansulfonate, trimethylsilylethynyl(phenyl)iodonium tetrafluoroborate, phenyl[2-(trimethylsilyl)phenyl]iodonium trifluoromethanesulfonate, phenyl(2,4,6-trimethoxyphenyl)iodonium p-toluenesulfonate and phenyl[3-(trifluoromethyl)phenyl] iodonium trifluoromethanesulfonate.

It has been found that a thiol co-initiator is particularly suitable as radical co-initiator, as it enhances the rate of polymerisation when irradiated with low intensity daylight and also provides the finished object with a dry surface finish. Thus, a suitable radical co-initiator may be described by the formula X—(SH)$_n$, where X is an organic moiety, which can be either a hydrocarbyl group or a heteroatom containing hydrocarbyl group, and n is a number from 1-4. It is further possible to incorporate a thiol group into the photopolymer backbone, e.g. by using thiol modified polyester acrylates.

It has been found that aryl iodonium salts are particularly suitable as cationic co-initiators to enhance the rate of polymerisation when irradiated with low intensity red light, preferably the co-initiator will be a diaryl iodonium salt. Thus, a suitable co-initiator may be described with the general formula (Ar)$_n$I+X-, where Ar is an aromatic or heteroaromatic moiety, X is an anion, e.g. chloride, bromide, iodide, nitrate, nitrite, hexafluorophosphate, tetrafluoroborate, trifluoromethansulfonate, perchlorate, hexafluoroarsenate an n is a number between 1-2.

Photopolymer formulations used in 3D printing typically contain radical or cationic stabilizers to avoid overexposure. Overexposure can either occur in the z-direction, or in the x-y direction. Overexposure in the z-direction is an unwanted solidification of resin under an overhang due to unwanted light penetration through already polymerised solid layers of photopolymer. This overcuring effect is source of inaccuracy and can be accounted for with software algorithms. Overcuring effects in the x-y plane are also possible in areas which are surrounded by liquid photopolymer are moderated by adjustment of the photoinitiators and stabilisers.

In order to overcome overcuring effects caused by the radical photopolymerisation process, radical stabilisers may be incorporated into the photopolymer formulation. Radical stabilisers can be either light absorbers which convert UV light into other energy sources, such as heat and prevent overcuring. These can be selected among 2-hydroxyphenyl-benzophenones, 2-(2-hydroxyphenyl)-benztriazoles, or 2-hydroxyphenyl-s-triazines. Stabilisers may also be molecules with antioxidant properties, which deactivate radicals. Said molecules may be hindered phenols, phosphites and thioethers. Stabilisers can be selected from: Irgastab UV10, Tinuvin 1130, Tinuvin 1577 ED, Tinuvin 1600, Tinuvin 213, Tinuvin 234, Tinuvin 234 FF, Tinuvin 312, Tinuvin 326, Tinuvin 326 FL, Tinuvin 326 K, Tinuvin 329, Tinuvin 360, Tinuvin 360 ED, Tinuvin 384-2, Tinuvin 400, Tinuvin 400 DW, Tinuvin 460, Tinuvin 477, Tinuvin 479, Tinuvin 5050, Tinuvin 5060, Tinuvin 571, Tinuvin 900, Tinuvin 928, Tinuvin 99-2, Tinuvin B75, Tinuvin P, Tinuvin PA 123, Tinuvin PA 144, Tinuvin PA 328 FF and Tinuvin 328 from BASF, 1,2,2,6,6-pentamethyl-4-piperdiyl methacrylate, 2-hydroxy-4-n-octoxybenzophenone, 2(2'-hydroxy-5'-methylphenyl)benzotriazole and N,N'-dimethyl benzamine.

The photopolymer formulation may further comprise cationic stabilisers to overcome overcure caused by uncontrolled cationic polymerisation processes. Said processes can occur in the z-direction, as well as in the x-y plane. Common cationic stabilisers are based on hindered amine light stabilisers (HALS), such as tetramethyl piperidine derivatives. HALS compounds include, but are not limited to: Tinuvin 111, Tinuvin 120, Tinuvin 123, Tinuvin 123-DW, Tinuvin 171, Tinuvin 249, Tinuvin 292, Tinuvin HP, Tinuvin 494 AR, Tinuvin 5100, Tinuvin 622 SF, Tinuvin 765, Tinuvin 770 DF, Tinuvin 783 FDL, Tinuvin 791 FB, Tinuvin 152, Tinuvin Nor 371 FFF, Tinuvin Pur 866, Tinuvin XT 200FF, Tinuvin XT 55 and Tinuvin XT 855 from BASF.

The photopolymer formulation may also comprise a combined stabiliser, which acts as a HALS and as a UV absorber simultaneously. Combined stabilisers include, but are not limited to Tinuvin 5151, Tinuvin 5248 and Tinuvin 5333 from BASF.

The photopolymer formulation may further comprise stabilisers which prevent the degradation of 3D printed parts with cured photopolymer. Experimentation has shown that HALS have a beneficial effect on the degradation kinetics of cured photopolymer parts.

Further stabilisers may include, but aren't limited to: sterically hindered monophenols, such as 2,6-di-tert-butyl-p-cresol and butylated hydroxytoluene (BHT), alkylates thiobisphenols, e.g. 2,2,-methylenebis(4-methyl-6-tert-butylphenol) and 2,2-bis(1-hydroxy-4-methyl-6-tert-butylphenyl) sulphide.

Preferably, the photopolymer formulation will comprise one radical stabiliser, e.g. from the Tinuvin family and one HALS compound. Some formulation in this embodiment will have an additional stabiliser, that prevents the degradation of the cured photopolymer in the 3D printed object. Some formulations in this embodiment will not contain any stabiliser. It has been found that formulations activated by daylight, red-light or a combination of both daylight and red-light, with wavelengths over 450 nm, in most cases don't require additional stabilisers, due to the low intensity of light. The light intensity outside the desired area, in which the object is being built, is too low to trigger photopolymerisation and thus prevents the object from overcuring. 'Substantially no stabilisers' of any type is intended to mean that no more such stabilisers are present than would be present in the formulation by virtue of having been present in the constituent chemicals of the photopolymer formulation when mixed together. All commercially available polymerisable materials, including oligomers and monomers contain small quantities of stabilisers. 'Substantially no stabilisers' of any given type may mean that no such stabilisers have been added to the formulation.

The formulation may further contain a plurality of particles. The particles may be sand, or a mixture of sand and a binder, which may be glass or an organic binder. It may be that the particles are glass. It may be that the particles are metal or ceramic, or a mixture thereof. It may be that the particles are polymer or rubber, or a mixture thereof. The particles may be organic, or inorganic pigments or a dye.

EXAMPLES

Figure 4:
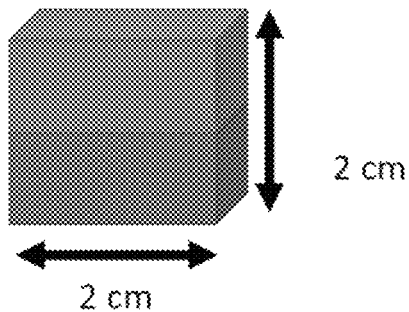
FIG. 4 describes the standard shape that was printed to demonstrate the upper and the lower halves of the cube exhibiting different properties.
Figure 5:
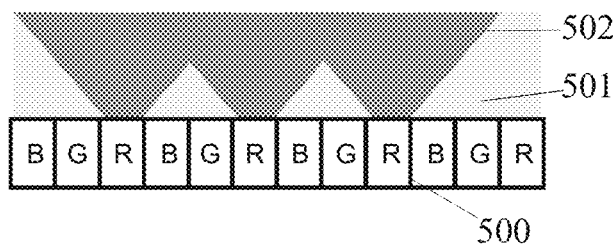
FIG. 5 describes a configuration where the LCD array is backlit in white light and only the red sub-pixel is creating polymerisation. This is the normal operating situation when operating with red-light photoinitiators such as zinc tetraphenylporphyrin or diaminoanthraquinone derivatives. The light is again emitted from the sub-pixel at an angle and this similarly meets to form an even intensity of light at a focal length which is the exposure plane at which polymerisation will take place.

FIG. 4 is a schematic representation of 3D test object for examples 1-12.

The 3D test object described in examples 1-12 and FIG. 4 was formed in a single printing process using a stereolithographic 3D printer, comprising a visual display screen illuminated by two light sources with different peak emissions. Said visual display screen is used as an imaging source with two back light sources, which have distinctly different wavelengths wavelength emission spectra. In the following examples the screen used in the tests was a 5.7" 2160×3840 pixel LCD array in RGB format from BOE in Beijing, China part number VS057QUM-NH2-62P0. It was back lit with a lensed LED array consisting of 38×3W LEDs with individual 12-degree angle of incidence collimating lenses on top of each one. The first light source emitting a first spectrum of light in the UV or blue-visible region and the second light source emitting a second spectrum of light in the green, orange or red part of the electromagnetic spectrum, wherein there is no overlap between the first and second spectrum of light. In some examples, a UV light source with the wavelength of 385 nm or 405 nm is illuminated through the same array as a predominantly red-light source with a wavelength of 635 nm. In some examples a UV light source with the wavelength of 385 nm or 405 nm is emitted through the same array as predominantly green-light source with the wavelength of 520 nm. In some examples a visible blue-light source with the wavelength of 460 nm is being emitted through the same array as a red-light source with the wavelength of 635 nm. In some examples a visible blue-light source with the wavelength of 460 nm is emitted through the same array as a green-light source with the wavelength of 520 nm. Both light sources are emitted through a colour LCD via the blue and red-subpixel when the LCD panel is back-illuminated with white light.

In a typical process of making the test object of examples 1-12 and FIG. 4 by stereolithographic printing, the object is created was formed on a build platform by sequential exposure of liquid photopolymer to light in layers, interspersed by motion perpendicularly away from the light source. The test object of FIG. 4 is created by forming the first set of 100 layers with a layer thickness of 100 microns by exposure of the photopolymer mixture in the vat to the first light spectrum. The second set of 100 layers with a layer thickness of 100 microns was formed by exposure to the second light spectrum. The finished object is then raised out of the photopolymer vat, the resin attached to the surface of the object is allowed to drain back into the vat and can be re-used for subsequent printing. The print platform with the solid object is then removed from the printer and the object is rinsed with water and isopropyl alcohol. Subsequently, the object is post exposed to UV light and heat for the required period of time.

Example 1

In this example, 500 grams of photopolymer formulation were prepared by mixing trimethylol propane triacrylate (TMPTA, Miramer M300, Miwon) 35% wt, 1,6-haxanediol diacrylate (HDDA, Miramer M200, Miwon) 25% wt and 3,3-dimethyloxetane (Sigma-Aldrich) 30% wt in a black flask. This mixture was stirred form 10 minutes to obtain a homogenous solution, then, 2-methyl-4'-(methylthio)-2-morpholinopropiophenone (Sigma Aldrich) 2% wt, zinc tetraphenyl porphyrin (Sigma Aldrich) 3% wt and diphenyl iodonium hexafluorophosphate (Sigma Aldrich), 5% wt were added slowly and the reaction mixture was sonicated at 50° C. until all solids dissolved.

Figure 6:
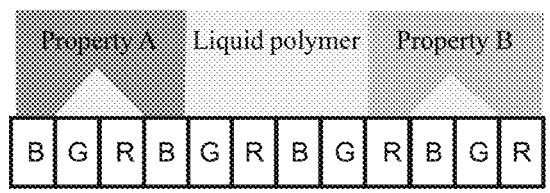
FIG. 6 describes a configuration where the LCD array emits a light of a lower wavelength (blue) and one of a higher wavelength (red) where the blue light cures the photopolymer to deliver property A and the red light cures the photopolymer to deliver property B.
Figure 7:
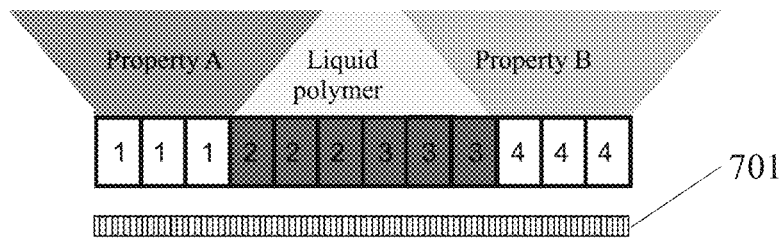
FIG. 7 describes a configuration where the monochrome LCD array emits a light of a lower wavelength through all of the subpixels in pixel '1'. Pixel '2' and '3' are closed and it emits light of a higher wavelength through all of the subpixels in pixel '4'. Here the LED array that backlights the LCD screen is a configuration LEDs with alternating lower and high wavelengths that can be turned on and off separately to emit lower and higher wavelength light. In this case it creates property A through the entire pixel at a lower wavelength and Property B through the entire pixel at the higher wavelength.

The 3D object was created using the setup described above and shown in FIG. 6, allowing for the selective use of UV light and visible light below 460 nm. These wavelengths were used in order to selectively induce the radical photopolymerisation. The bottom part of the 3D object was built using radical photopolymerisation. After completion of the bottom part of the 3D object, the red subpixels were used in order to selectively induce the cationic photopolymerisation. The top part of the 3D object was built using a cationic photopolymerisation process. After completion of the 3D printing process, the finished object was removed from the platform and post exposed under UV light and red light for 60 minutes, respectively.

Example 2

In this example, 350 grams of the photopolymer formulation were prepared by mixing urethane dimethacrylate (Ebecryl 4859, Allnex) 20% wt, triethylene glycol dimethacrylate (Miramer M233, Miwon), 29% wt and 1,2-diepoxypentane (Sigma-Aldrich) 36.95% wt in a black flask. The mixture was stirred for 15 minutes at room temperature until a homogeneous, colourless solution was obtained. Then, bis($\eta^5$-2,4-cyclopentadien-1-yl)-bis(2,6-difluoro-3-(1H-pyrrol-1-yl)-phenyl) titanium (IV) (Rainbow Chemicals) 0.5% wt and 9-cyano-2-octanoyl-4,5,7-triiodo-3-hydroxyfluorone 1.5% wt were added to the reaction mixture and the resulting suspension was heated to 50° C. for 12 hours under occasional stirring until all solids dissolved. Subsequently, Tinuvin 5333 (BASF) 0.05% wt, bis(4-tert-butylphenyl) iodonium hexafluorophosphate (Sigma Aldrich) 6% wt and dodecathiol (Sigma Aldrich) 5% wt were added to the reaction mixture and the resulting suspension was sonicated at 50° C. until all solids dissolved.

The 3D object was created using the setup described above and shown in FIG. 6 allowing for the selective use of visible blue-light with a wavelength of 460 nm and red light with the wavelength of 635 nm. The blue-light is used to selectively induce the radical photopolymerisation process, whereas the red-light is used to selectively induce the cationic photopolymerisation process. The bottom part of the 3D object was built using radical photopolymerisation. After completion of the bottom part of the 3D object, the red-subpixels were used in order to selectively induce the cationic photopolymerisation. The top part of the 3D object was built using a cationic photopolymerisation process. After completion of the 3D printing process, the finished object was removed from the platform and post exposed under UV light and red light for 60 minutes, respectively.

Example 3

In this example, 350 grams of the photopolymer formulation were prepared by mixing urethane dimethacrylate (Ebecryl 4859, Allnex) 20% wt, triethylene glycol dimethacrylate (Miramer M233, Miwon), 29% wt and 1,2-diepoxypentane (Sigma-Aldrich) 36.95% wt in a black flask. The mixture was stirred for 15 minutes at room temperature until a homogeneous, colourless solution was obtained. Then, bis($\eta^5$-2,4-cyclopentadien-1-yl)-bis(2,6-difluoro-3-(1H-pyrrol-1-yl)-phenyl) titanium (IV) (Rainbow Chemicals) 0.5% wt and 9-cyano-2-octanoyl-4,5,7-triiodo-3-hydroxyfluorone 1.5% wt were added to the reaction mixture and the resulting suspension was heated to 50° C. for 12 hours under occasional stirring until all solids dissolved. Subsequently, Tinuvin 5333 (BASF) 0.05% wt, bis(4-tert-butylphenyl) iodonium hexafluorophosphate (Sigma Aldrich) 6% wt and dodecathiol (Sigma Aldrich) 5% wt were added to the reaction mixture and the resulting suspension was sonicated at 50° C. until all solids dissolved. Then, the red pigment dispersion D3010-FX-122 (Sun Chemicals) 0.5% wt was added to the reaction mixture to yield a pink resin formulation.

The 3D object was created using the setup described above and shown in FIG. 6 allowing for the selective use of visible blue-light with a wavelength of 460 nm and red light with the wavelength of 635 nm. The blue-light is used to selectively induce the radical photopolymerisation process, whereas the red-light is used to selectively induce the cationic photopolymerisation process. The bottom part of the 3D object was built using radical photopolymerisation. After completion of the bottom part of the 3D object, the red subpixels were used in order to selectively induce the cationic photopolymerisation. The top part of the 3D object was built using a cationic photopolymerisation process. After completion of the 3D printing process, the finished object was removed from the platform and post exposed under UV light and red-light for 60 minutes, respectively.

Example 4

In this example 300 grams of photopolymer resin were prepared by mixing trimethylol propane triacrylate (TMPTA, Miramer M300, Miwon) 30% wt, neopentylglycol (2PO) diacrylate (Miramer M216, Miwon) 30% wt and 3-hydroxyoxentane (Sigma-Aldrich) 30% wt in a black bottle. The reaction mixture was stirred for 15 minutes in order to obtain a homogeneous solution. Then, bis($\eta^5$-2,4-cyclopentadien-1-yl)-bis-(2,6-difluoro-3-(1H-pyrrol-1-yl)-phenyl) titanium (IV) (Rainbow Chemicals) 1% wt and Eosin Y (Sigma-Aldrich) 3% wt were added to the reaction mixture and the resulting dispersion was heated to 50° C. for 12 hours, followed by 30 minutes of sonication at 50° C. until all solids were dissolved. Subsequently, pentaerythritol tetrakis(mercaptoacetate) (Sigma-Aldrich) 1.5% wt, bis(pyridine) iodonium hexafluorophosphate (Sigma-Aldrich) 4.45% wt and Tinuvin 5151 (BASF) 0.05% wt were added to the photopolymer formulation and the resulting reaction mixture was stirred for 60 minutes at room temperature, followed by a sonication for 30 minutes at 50° C.

The 3D object was created using the setup described above and shown in FIG. 6, allowing for the selective use of visible blue light with a wavelength of 460 nm and green light with the wavelength of 520 nm The blue light is used to selectively induce the radical photopolymerisation process, whereas the green light is used to selectively induce the cationic photopolymerisation process. The bottom part of the 3D object was built using radical photopolymerisation. After completion of the bottom part of the 3D object, the green-subpixels were used in order to selectively induce the cationic photopolymerisation. The upper part of the 3D object was built using a cationic photopolymerisation process. After completion of the 3D printing process, the finished object was removed from the platform and post exposed under UV light for 60 minutes.

Example 5

In this example 400 grams of the photopolymer formulation was prepared by mixing tricyclodecanediemethanol diacrylate (TCDDA, Miramer M262, Miwon) 20% wt, trimethylolpropane triacrylate (TMPTA, Miramer M300, Miwon), 20% wt, 1,2-epoxyhexane (Sigma-Aldrich) 40% wt, Eosin Y (Sigma-Aldrich) 3% wt and 3-hydroxybenzophenone in a black bottle. The reaction mixture was stirred for 90 minutes at room temperature and subsequently heated to 50° C. for 12 hours with occasional stirring. After dissolution of all solids, triethanolamine (TEA, Sigma Aldrich) 8.95%, bis(pyridine)iodonium tetrafluoroborate (Sigma Aldrich) 6% wt and Tinuvin 5151 (BASF) 0.05% wt were added and the reaction mixture was stirred for 120 minutes at room temperature, followed by 30 minutes sonication at room temperature.

The 3D object was created using the setup described above and shown in FIG. 6, allowing for the selective use of UV light with wavelengths below 460 nm. These wavelengths were used in order to selectively induce the radical photopolymerisation. The bottom part of the 3D object was built using radical photopolymerisation. After completion of the bottom part of the 3D object, the green subpixels were used in order to selectively induce the cationic photopolymerisation. The upper part of the 3D object was built using a cationic photopolymerisation process. After completion of the 3D printing process, the finished object was removed from the platform and post exposed under UV light for 60 minutes.

Example 6

In this example 250 grams of the photopolymer formulation was prepared by mixing tricyclodecanediemethanol diacrylate (TCDDA, Miramer M262, Miwon) 20% wt, trimethylolpropane triacrylate (TMPTA, Miramer M300, Miwon), 20% wt, 1,2-epoxyhexane (Sigma-Aldrich) 40% wt, Eosin Y (Sigma-Aldrich) 3% wt and 3-hydroxybenzophenone in a black bottle. The reaction mixture was stirred for 90 minutes at room temperature and subsequently heated to 50° C. for 12 hours with occasional stirring. After dissolution of all solids, triethanolamine (TEA, Sigma Aldrich) 8.95%, bis(pyridine)iodonium tetrafluoroborate (Sigma Aldrich) 6% wt and Tinuvin 5151 (BASF) 0.05% wt were added and the reaction mixture was stirred for 120 minutes at room temperature, followed by 30 minutes sonication at room temperature. Then, the pigment dispersion D3010-FX-122 (Sun Chemicals) 0.5% was added to the reaction mixture and the reaction mixture was stirred for 30 minutes at room temperature to give a deep pink photopolymer resin.

The 3D object was created using the setup described above and shown in FIG. 6, allowing for the selective use of UV light with wavelengths below 460 nm. These wavelengths were used in order to selectively induce the radical photopolymerisation. The bottom part of the 3D object was built using radical photopolymerisation. After completion of the bottom part of the 3D object, the green-subpixels were used in order to selectively induce the cationic photopolymerisation. The top part of the 3D object was built using a cationic photopolymerisation process. After completion of the 3D printing process, the finished object was removed from the platform and post exposed under UV light for 60 minutes.

Example 7

In this example 320 grams of the photopolymer formulation was prepared by mixing polyethylene glycol 200 diacrylate (PEG200DA, Miramer M282, Miwon) 30.95% wt, triethylene glycol dimethacrylate (TEGDMA, Miramer M233, Miwon) 5% wt, urethane dimethacrylate (UDMA, Ebecryl 4859, Allnex) 10% wt and 3,3-diemethyloxetane (Sigma Aldrich) 40% wt. The resulting clear reaction mixture was stirred for 10 minutes at room temperature to give a homogenous, colourless solution. Then, 4-dimethylaminobenzophenone (Sigma Aldrich) 2% wt, zinc tetraphenylporphyrin (ZnTpp, Sigma Aldrich) 1% wt, and Tinuvin 123 (BASF) 0.05% wt were added and the resulting reaction mixture was heated to 50° C. for 12 hours with occasional stirring. After cooling to room temperature, diphenyliodonium hexafluorophosphate (Sigma Aldrich) 5% wt and triethylamine (TEA, Sigma Aldrich) 6% wt were added and the reaction mixture was sonicated for 30 minutes at 50° C. Subsequently, the pigment dispersion D3010-FX-122 (Sun Chemicals) was added to the reaction mixture and the resulting dispersion was stirred for 30 minutes at room temperature to give a deep red/pink photopolymer resin.

The 3D object was created using the setup described above and shown in FIG. 6, allowing for the selective use of UV light with wavelengths below 460 nm. These wavelengths were used in order to selectively induce the radical photopolymerisation. The bottom part of the 3D object was built using radical photopolymerisation. After completion of the bottom part of the 3D object, the red-subpixels were used in order to selectively induce the cationic photopolymerisation. The top part of the 3D object was built using a cationic photopolymerisation process. After completion of the 3D printing process, the finished object was removed from the platform and post exposed under UV light and red light for 60 minutes, respectively.

Example 8

In this example the 440 grams of the photopolymer resin formulation were prepared by mixing urethane dimethacrylate (UDMA, Ebecryl 4859, Allnex), 20% wt, 1,6-hexanediol diacrylate (HDDA, Miramer M200, Miwon) 14.95% wt, ethylene glycol dimethacrylate (EGDMA, Miramer M221, Miwon) 20% wt and 3,3-dimethyloxetane (Sigma Aldrich) 30% wt. The resulting clear reaction mixture was stirred for 10 minutes at room temperature. Then, β-mercaptoethanol (Sigma Aldrich), 3% wt, Tinuvin 5151 (BASF) 0.05% wt and di(phenyl)iodonium trifluoromethansulfonate (Sigma Aldrich) 5% wt were added to the photopolymer mixture and the resulting dispersion was sonicated for 60 minutes at 50° C. until all solids were dissolved. Then, Filasmart® particles (Lawrence Industries) 5% wt were added using a Dissolver Dispermat CN10 (VMA-Getzmann GmbH) high shear mixer and shear speeds of 4000 rmp in order to obtain a homogeneous dispersion of particles in the photopolymer resin. Subsequently, bis($\eta^5$-2,4-cyclopentadien-1-yl)-bis(2,6-difluoro-3-(1H-pyrrol-1-yl)-phenyl)titanium (IV) (Rainbow Chemicals) 0.5%, tetraphenylporphyrin (Sigma Aldrich) 1.5% wt and -mercaptoethanol were added to the reaction mixture. In order to dissolve all solids, the reaction mixture was heated to 50° C. for 12 hours with occasional stirring.

The 3D object was created using the setup described above and shown in FIG. 6, allowing for the selective use of visible blue light with a wavelength of 460 nm and red light with the wavelength of 635 nm. The blue light is used to selectively induce the radical photopolymerisation process, whereas the red light is used to selectively induce the cationic photopolymerisation process. The bottom part of the 3D object was built using radical photopolymerisation. After completion of the bottom part of the 3D object, the red subpixels were used in order to selectively induce the cationic photopolymerisation. The upper part of the 3D object was built using a cationic photopolymerisation process. After completion of the 3D printing process, the finished object was removed from the platform and post exposed under UV light for 60 minutes.

Example 9

In this example 250 gram of the photopolymer formulation were prepared by mixing trimethylol propane (6EO) triacrylate (TMP(EO)6TA, Miramer M3160, Miwon) 20% wt, 1,6-hexanediol diacrylate (HDDA, Miramer M200), 26.95% wt and 1,2-diepoxypentane (Sigma Aldrich) 40% wt in a black flask and stirring the clear reaction mixture for 10 minutes. Subsequently, Filasmart® particles (Lawrence Industries) 5% wt were added using a Dissolver Dispermat CN10 (VMA-Getzmann GmbH) high shear mixer and shear speeds of 4000 rmp in order to obtain a homogeneous dispersion of particles in the photopolymer resin. Then, bis($\eta^5$-2,4-cyclopentadien-1-yl)-bis-(2,6-difluoro-3-(1H-pyrrol-1-yl)-phenyl) titanium (IV) (Rainbow Chemicals), 0.5% wt, Eosin Y (Sigma Aldrich) 2.5%, di(phenyl)iodonium hexafluorophosphate (Sigma Aldrich) 3.5% wt, triethanolamine (TEOA, Sigma Aldrich) 1.5% wt and Tinuvin 5333 (BASF) 0.05% were added to the reaction mixture and the reaction mixture was heated to 50° C. for 18 hours with occasional stirring. After this period, the pigment dispersion D3010-FX-122 (Sun Chemicals) 0.5% wt was added to the reaction mixture and the resulting dispersion was stirred for 30 minutes at room temperature.

The 3D object was created using the setup described above and shown in FIG. 6, allowing for the selective use of visible blue light with a wavelength of 460 nm and green light with the wavelength of 520 nm The blue light is used to selectively induce the radical photopolymerisation process, whereas the green light is used to selectively induce the cationic photopolymerisation process. The bottom part of the 3D object was built using radical photopolymerisation. After completion of the bottom part of the 3D object, the green-subpixels were used in order to selectively induce the cationic photopolymerisation. The top part of the 3D object was built using a cationic photopolymerisation process. After completion of the 3D printing process, the finished object was removed from the platform and post exposed under UV light for 60 minutes.

Example 10

In this example 460 grams of photopolymer formulation were prepared by mixing 1,6-hexandiol diacrylate (HDDA, Miramer M200, Miwon), 20%, trimethylpropane triacrylate (TMPTA, Miramer M300), 24%, bis[4-(glycidyloxyl)phenyl]methane (Eponex 1510, Hexion), 42% and 1-dodecathiol (Sigma Aldrich), 3% in a black plastic bottle and stirring the reaction mixture for 15 minutes. Subsequently, diphenyl[3-(phenylsulfanyl)phenyl]sulfanium hexafluorophosphate (Speedcure 992, Lambson), 6% and zinc tetraphenylporphyrin (Sigma Aldrich), 5% were added and the reaction mixture was mixture was heated to 50° C. for 18 hours with occasional stirring.

The 3D object was created using the setup described above and shown in FIG. 6, allowing for the selective use of UV light with the wavelength of 355 nm and red light with the wavelength of 635 nm The blue UV light is used to selectively induce the cationic photopolymerisation process, whereas the red light is used to selectively induce the radical photopolymerisation process. The bottom part of the 3D object was built using cationic photopolymerisation. After completion of the bottom part of the 3D object, the red-subpixels were used in order to selectively induce the radical photopolymerisation. The top part of the 3D object was built using a radical photopolymerisation process. After completion of the 3D printing process, the finished object was removed from the platform and post exposed under UV light for 60 minutes.

Example 11

In this example 460 grams of photopolymer formulation were prepared by mixing 1,6-hexandiol diacrylate (HDDA, Miramer M200, Miwon), 20%, trimethylpropane triacrylate (TMPTA, Miramer M300), 24%, bis[4-(glycidyloxyl)phenyl]methane (Eponex 1510, Hexion), 42% and 1-dodecathiol (Sigma Aldrich), 3% in a black plastic bottle and stirring the reaction mixture for 15 minutes. Subsequently, diphenyl[3-(phenylsulfanyl)phenyl]sulfanium hexafluorophosphate (Speedcure 992, Lambson), 6% and zinc tetraphenylporphyrin (Sigma Aldrich), 5% were added and the reaction mixture was mixture was heated to 50° C. for 18 hours with occasional stirring. Subsequently, the transparent reaction mixture was cooled to room temperature and the pigment dispersion D3010-FX-122 (Sun Chemicals) 0.5% wt was added to the reaction mixture and the resulting dispersion was stirred for 30 minutes at room temperature.

The 3D object was created using the setup described above and shown in FIG. 6, allowing for the selective use of UV light with the wavelength of 355 nm and red light with the wavelength of 635 nm The blue UV light is used to selectively induce the cationic photopolymerisation process, whereas the red light is used to selectively induce the radical photopolymerisation process. The bottom part of the 3D object was built using cationic photopolymerisation. After completion of the bottom part of the 3D object, the red-subpixels were used in order to selectively induce the radical photopolymerisation. The top part of the 3D object was built using a radical photopolymerisation process. After completion of the 3D printing process, the finished object was removed from the platform and post exposed under UV light for 60 minutes.

Example 12

In this example 520 grams of photopolymer formulation were prepared by mixing urethane dimethacrylate (UDMA, Ebecryl 4859, Allnex), 23.5%, triethylene glycol dimethacrylate (TEGDMA, Miramer M233, Miwon) 22%, bis[4-(glycidyloxyl)phenyl]methane (Eponex 1510, Hexion), 32% and triethanolamine (Sigma Aldrich), 8% were mixed in a black plastic bottle and the clear mixture was stirred for 10 minutes at room temperature. Then, diphenyl[2-(phenylsulfanyl)phenyl]sulfonium hexafluoroantimonate (Speedcure 976, Lambson), 8.5% and Eosin Y (Sigma Aldrich), 6% were added and the reaction mixture was heated to 50° C. for 18 hours with occasional stirring.

The 3D object was created using the setup described above and shown in FIG. 6, allowing for the selective use of UV light with the wavelength of 355 nm and green light with the wavelength of 520 nm. The blue UV light is used to selectively induce the cationic photopolymerisation process, whereas the green light is used to selectively induce the radical photopolymerisation process. The bottom part of the 3D object was built using cationic photopolymerisation. After completion of the bottom part of the 3D object, the green-subpixels were used in order to selectively induce the radical photopolymerisation. The top part of the 3D object was built using a radical photopolymerisation process. After completion of the 3D printing process, the finished object was removed from the platform and post exposed under UV light for 60 minutes.

The invention claimed is:

1. A 3D printing method for creating a 3D object, the method comprising:
   forming a plurality of layers of cured polymer by exposing a liquid photopolymer formulation to a first spectrum of light and a second spectrum of light creating different properties in the cured polymer;
   wherein there is no overlap between the first spectrum of light and the second spectrum of light;
   wherein the photopolymer formulation comprises:
      a first photoinitiator that is activated by light in the first spectrum of light;
      a second photoinitiator that is activated by light in the second spectrum of light;

a first set of at least one monomer or oligomer that is polymerised by free radical polymerisation when the first photoinitiator is activated by the first spectrum of light; and a second set of at least one monomer or oligomer that is polymerised by cationic polymerisation when the second photoinitiator is activated by the second spectrum of light;

wherein the exposing is performed by a colour LCD screen back-illuminated with white light passing through first and second colours of sub-pixels of the LCD screen for forming the first and second spectrums of light, respectively, with the LCD screen being controllable to:

form first and second sets of the cured layers by exposing to the first and second spectrums of light, respectively, with the first and second sets of the cured layers being formable to alternate with one another and as groups in distinct portions of the 3D object;

form any of the cured layers to have first and second sets of layer pixels exposed to the first and second spectrums of light, respectively; and form any layer pixel of any of the cured layers by simultaneously exposing to both the first and second spectrums of light.

2. The method of claim 1, wherein:

the first set of the at least one monomer or oligomer can be polymerised via a light-induced radical photopolymerisation process, but not via a cationic polymerisation process;

the second set of the at least one monomer or oligomer can be polymerised via a light-induced cationic mechanism, but not via a radical polymerisation process;

the first photoinitiator that is activated by UV or blue light having a wavelength range between 300-475 nm;

the second photoinitiator is activated by green or red light; and the liquid photopolymer formulation further comprises at least one co-initiator.

3. The method of claim 2, wherein the formulation comprises:

the first set of at least one monomer or oligomer present at a total amount of 10-95 wt %;

the second set of at least one monomer or oligomer present at a total amount of 10-95 wt %;

the first photoinitiator and second photoinitiator present at a total amount of 0.1-20 wt %; and the at least one co-initiator present in a total amount of 0.1-20 wt %.

4. The method of claim 2, wherein the total amount of the first photoinitiator is between 0.5-2.5% by weight.

5. The method of claim 2, wherein the first photoinitiator is selected from: anthraquinone, anthraquinone-2-sulfonic acid, (benzene) tricarbonyl chromium, benzyl, benzophenone, benzophenone/1-hydroxycylohexyl phenyl ketone blends, 3,3',4,4'-benzoohenonetetracarboxylic acid dianhydride, 4-benzo ylbisphenyl, 2-benzyl-2-(dimethylamino)-4'-morpholinobutyrophenone, 4,4'-bis(dimethylamino)benzophenone, camphorquinone, 2-chlorothioxanthen-9-one, dibenzosuberenone, 2,2'-diethoxyacetophenone, 4,4'-dihydroxybenzophenone, 4-(dimethylamino)benzophenone, 2,5-diemthylbenzophenone, diphenyl(2,4,6 trimethylbenzoyl) phosphine oxide/2-hydroxy-2-methylpropiophenone blends, ethylanthraquinone, 3'-hydroxyacetophenone, 3-hydroxybenzophenone, 4-hydroxybenzophenone, thioxanthene-9-one, triarylsulfonium hexafluoroantimonate salts, triarylsulfonium hexafluorophosphate salts, methylbenzoylformate, 2-methyl-4'-(methylthio)-2-morpholinopropiophenone, 1-benzyl-2,N,N-dimethylamino-1-(4-morpho linophenyl)-1-butanone, phenanthrenequinone, 1,-hydroxy-cyclohexyl phenyl ketone, oxy-phenyl-acetic acid 2-[2 oxo-2-phenyl-acetoxy-ethoxy]-ethyl ester, diphenyl(2,4,6-trimethylbenzoyl) phosphine oxide, phenyl bis(2, 4,6-trimethylbenzoyl) phosphine oxide, diphenyl[3-(phenylsulfanyl)phenyl] sulfanium hexafluorophosphate, diphenyl [2-(phenylsulfanyl)phenyl] sulfonium hexafluorophosphate, tetramesitylporphyrin cobalt, bis($\eta_5$-2,4-cylopendien-1-yl)bis [2,6-difluoro -3-(1H-pyrrol-1-yl)phenyl] titanium (IV), titanocene bis(trifluoromethanesulfonate), titanocene dichloride, (indenyl) titanium (IV) trichloride, (pentamethylcyclopentadienyl) titanium (IV) trichloride, cyclopentadienyltitanium (IV) trichloride, bis(cyclopentadienyl) titanium (IV) pentasulfide, (4R, 5R)-chloro-cylopentadienyl- [2,2-dimethyl-1,3-dioxalan-4,5-bis(diphenylmethoxy)] titanium (IV), (4R, 5S)-chloro-cylopentadienyl-[2,2-dimethyl-1,3-dioxalan-4,5-bis(diphenylmethoxy)] titanium (IV), and mixtures thereof.

6. The method of claim 5, wherein the first photoinitiator is bis($\eta^5$-2,4-cyclopentadien-1-yl)-bis(2,6-difluoro-3-(1H-pyrrol-1-yl)-phenyl) titanium (IV).

7. The method of claim 2, wherein the total amount of the second photoinitiator is between 1-4% by weight.

8. The method of claim 2, wherein the second photoinitiator is selected from: 1-amino-4-anilinoanthraquinone, 1,4-bis(p-tolylamino)anthraquinone, 1,4-bis(pentylamino) anthraquinone, 1-amino-4-hydroxyanthraquinone, 1,4-diaminoanthraquinone, 1,5-diaminoanthraquinone, tetraphenylporphyrin, tetra-o-tolylporphyrin, tetrakis(2,6-dimethylphenyl)porphyrin, tetramesitylporphyrin, tetrakis (2,6-diisopropylphenyl)porphyrin, tetrakis(2-chlorophenyl) porphyrin, tetrakis(2-bromophenyl)porphyrin, tetra (naphthalen-2-yl)porphyrin, zinc tetraphenylporphyrin, zinc tetra-o-tolylporphyrin, zinc tetrakis(2,6-dimethylphenyl) porphyrin, zinc tetramesitylporphyrin, zinc tetrakis(2,6-diisopropylphenyl)porphyrin, zinc tetrakis(2-chlorophenyl) porphyrin, zinc tetrakis(2-bromophenyl)porphyrin, zinc tetra(naphthalen-2-yl)porphyrin, eosin Y, 2-octanoyl-4,5,7-triiodo-3-hydroxy-6-fluorone, 9-cyano -2-octanoy1-4,5,7-triiodo-3-hydroxy-6-fluorone, 2-octyl-4,5,7-triido-3-hydroxy-6-fluorone, 9-cyano-2-octyl-4,5,7-triido-3-hydroxy-6-fluorone, 3,3- [(dimethyl-1-propylindolin-2-ylidene) penta-1,3-dien-1-yl]-1,1-diemthyl-3-pentyl-1H-benzoindo1-3-ium butyltriphenylborate, 1,3-[(dibutyl-3,3-dimethylindolin-2-ylidene)penta-1,3-dien-1-yl]-1,1-diemthyl-1H-benzoindol-3-ium butyltriphenylborate, {[(2-chloro- 1,3,3 -trimethyl-2-ylidene)ethylidene]cyclohe-1-en-1-yl}vinyl-1,3,3-trimethyl-1H-benzoindol-3-iumbutyltriphenylborate, and [2-chloro-(1,3,3,-trimethyl-1, 3-dihydro-2H-benzoindole-2-ylidene)cyclohex-1-en-1-yl] vinyl-1,3,3-trimethyl-1H-benzoindol-3-ium.

9. The method of claim 2, wherein the at least one co-initiator comprises at least one radical co-initiator and at least one cationic co-initiator.

10. The method of claim 9, wherein the at least one radical co-initiator is selected from: 2-mercaptobenzoxazole, 2-mercaptobenzothiazole, 2-mercaptobenzimidazole, pentaerythritol tetrakis(mercaptoacetate), 4-acetamidothiophenol, mercaptosuccinic acid, dodecathiol, β-mercaptoethanol, 6-ethoxy-2-mercaptobenzathiazole, 4-methyl-4H-1,2,4-triazole-3-thiol, 2-mercapto-1-methylimidazole, 2-mercapto-5-1,3,4-thiadiazole, 5-N-butylthio-2-mercapto-1,3,4-thiadiazole, 4-methoxybenzene thiol, 2-phenyl-1H-tetrazole-5-thiol, 4-phenyl-4H-1,2,4-triazole-3-thiol, pentaerythriol tetrakis(3-mercaptopropionate), trimethylolpropane-tris (mercaptoacetate), 2-mercaptopyridine, 4-mercaptopyridine, 2-mercapto-3H-quinazoline and 2-mercaptothiazoline, allylamine, 2,2-bis(aminoethoxy)propane, 4-chloro-o-pehnylenediamine, 1,3-cyclohexanebis(methylamine), 1,3-diaminoacetone, 1,4-diaminoanthraquinone, aniline, 1,5-diamino-methylpentane, 1,9-diaminononane, 2,4-diaminotoluene, 2,6-diaminotoluene, diaminoethane, 1,3-diaminopropane, iso-propyl diamine, 2,2'-(ethylenedioxy) bis(ethylamine), 4,4'-methylenebis(2,6-diethylaniline), 3,3'-methylenedianiline, triethanolamine, triethylamine, tris(2-aminoethyl)amine, N,N'-diisopropylethylenediamine, N,N'-diisopropyl-1,3-propanediamine, N,N'-dimethyl-1,3-propanediamine, 4,4'-bis(diethylamino)benzophenone, 4-(diethylamino)benzophenone, 2-(diethylamino)ethyl acrylate, 2-(diethylamino)ethyl methacrylate, 3-(dimethylamino)propyl acrylate, ethyl 4-(dimethylamino)benzoate, 2-dimethylamino-ethylbenzoate, isoamyl-4-(dimethylamino)benzoate, 2-ethylhexyl 4-(dimethylaminobenzoate), Michler's ketone, 2-phenyl-4,6-bis(trichloro methyl)-s-triazine, 2,4,6-tris(trichloromethyl)-s-triazine, 2-(p-methoxystyryl)-4,6-bis(trichloromethyl)-s-triazine, 2-(styryl-4,6-bis(trichloromethyl)s-triazine, 2-(p-methoxystyryl)-4,6-bis(trichloromethyl)-s-triazine, 2-(4-methoxy-naphtho-y-yl)-4,6-bis(trichloro methyl)-s-triazine and 2-[4-(2-thoxyethyl)-naphtho-1-yl]-4,6-bis(trichloromethyl)-s-triazine, or a mixture thereof.

11. The method of claim 9, wherein the at least one cationic co-initiator is selected from: bis(2,4,6-trimethylpyridine)iodonium hexaflurophosphate, bis(4-tert-butylphenyl)iodonium hexafluorophosphate, bis(pyridine) iodonium hexafluorophosphate, bis(pyridine)iodonium tetrafluoroborate, bis(4-bromophenyl)iodonium trifluoromethansulfonate, bis(2,4,6-trimethylphenyl)iodonium trifluoromethansulfonate, [4-(bromomethyl)phenyl](2,4,6-trimetho xyphenyl) iodonium-p-toluenesulfonate, bis(4-fluorophenyl)iodonium trifluoromethansulfonate, (3-bromophenyl)(mesityl) iodonium trifluoromethansulfonate, 4-biphenylyl(2,4,6-trimethoxyphenyl) iodonium trifluoromethansulfonate, diphenyliodonium hexafluorophosphate, dipehnyliodonium perchlorate, diphenyliodonium hexafluoroarsenate, diphenyliodonium trifluoromethansulfonate, diphenyliodonium chloride, diphenyliodonium nitrate, diphenyliodonium bromide, diphenyliodonium iodide, diphenyliodonium-2-carboxylate monohydrate, (3,5-dichlorophenyl)(2,4,6-trimetho xyphenyl) iodonium p-toluenesulfonate, ethyl(phenyl) iodonium tetrafluoroborate, (5-fluoro-2-nitrophenyl)(2,4,6-trimethoxyphenyl)iodonium p-toluenesulfonate, [4-fluoro-3-(trifluoromethyl)phenyl](2,4,6-trimetho xyphenyl)iodonium p-toluenesulfonate, 4-isopropyl-4'-methyldiphenyliodonium tetrakis(pentafluorophenyl)borate, (2-methylphenyl)(2,4,6-trimethylphenyl)iodonium trifluoromethansulfonate, (3-methylphenyl)(2,4,6-trimethylphenyl) iodonium trifluoromethansulfonate, (4-methylphenyl) (2,4,6-trimethylphenyl)iodonium trifluoromethansulfonate, (4-nitrophenyl)iodonium trifluoromethansulfonate, (perfluorohexyl)phenyliodonium trifluoromethansulfonate, (perfluoro-n-octyl)phenyliodonium trifluoromethansulfonate, (perfluoropropyl)phenyliodonium trifluoromethansulfonate, trimethyls ilylethynyl(phenyl)iodonium tetrafluoroborate, phenyl[2-(trimethylsilyl)phenyl]iodonium trifluoromethansulfonate, phenyl(2,4,6-trimethoxyphenyl)iodonium p-toluenesulfonate and phenyl[3-(trifluoromethyl)phenyl) iodonium trifluoromethanesulfonate, or a mixture thereof.

12. The method of claim 2, wherein the total amount of co-initiator present is between 1-10% by weight.

13. The method of claim 2, wherein the formulation further comprises a pigment, dye, ceramic, sand, or metal filler.

14. The method of claim 1, wherein the method is performed by a stereolithographic 3D printer comprising the LCD screen illuminated by two the white light.

15. The method of claim 14, the printer further comprising:
   a vat containing the liquid photopolymer formulation;
   a build platform having a build surface for use in the vat whilst stereolithographically printing the 3D object by said exposing; and
   an actuator for varying the separation of the build surface and the LCD screen.

16. The method of claim 1, further comprising forming the first and second sets of the cured layers by exposing to the first and second spectrums of light, respectively, with the first and second sets of the cured layers alternating with one another in the 3D object.

17. The method of claim 1, further comprising forming the first and second sets of the cured layers by exposing to the first and second spectrums of light, respectively, with the first and second sets of the cured layers being formed as groups in distinct portions of the 3D object.

18. The method of claim 1, further comprising forming one or more of the cured layers to have first and second sets of layer pixels exposed to the first and second spectrums of light, respectively.

19. The method of claim 1, further comprising forming one or more layer pixels of one or more of the cured layers by simultaneously exposing to both the first and second spectrums of light.

20. The method of claim 1, further comprising performing two or more of:
   forming first and second sets of the cured layers by exposing to the first and second spectrums of light, respectively, with the first and second sets of the cured layers alternating with one another in the 3D object;
   forming first and second sets of the cured layers by exposing to the first and second spectrums of light, respectively, with the first and second sets of the cured layers being formed as groups in distinct portions of the 3D object;
   forming one or more of the cured layers to have first and second sets of layer pixels exposed to the first and second spectrums of light, respectively; and
   forming one or more layer pixels of one or more of the cured layers by simultaneously exposing to both the first and second spectrums of light.

* * * * *